(12) United States Patent
Noda

(10) Patent No.: US 8,502,417 B2
(45) Date of Patent: Aug. 6, 2013

(54) POWER SOURCE DEVICE AND OUTPUT VOLTAGE CHANGING METHOD OF THE POWER SOURCE DEVICE

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 472 days.

(21) Appl. No.: 12/934,343

(22) PCT Filed: Apr. 7, 2009

(86) PCT No.: PCT/JP2009/057424
§ 371 (c)(1),
(2), (4) Date: Sep. 24, 2010

(87) PCT Pub. No.: WO2009/125866
PCT Pub. Date: Oct. 15, 2009

(65) Prior Publication Data
US 2011/0018347 A1  Jan. 27, 2011

(30) Foreign Application Priority Data
Apr. 11, 2008  (JP) ................................ 2008-104163

(51) Int. Cl.
*H02J 1/00* (2006.01)
(52) U.S. Cl.
USPC .......................................................... 307/80
(58) Field of Classification Search
USPC .......................................................... 307/80
See application file for complete search history.

(56) References Cited

U.S. PATENT DOCUMENTS

| 2007/0222502 A1 | 9/2007 | Noda |
| 2009/0066305 A1 | 3/2009 | Noda |

FOREIGN PATENT DOCUMENTS

| JP | 58-224562 | 12/1983 |
| JP | 9-65646 | 3/1997 |
| JP | 2003-169472 | 6/2003 |
| JP | 2003-304679 | 10/2003 |
| JP | 2006-277760 | 10/2006 |

OTHER PUBLICATIONS

International Search Report and Written Opinion in PCT/JP2009/057424.

*Primary Examiner* — Robert L. Deberadinis
(74) *Attorney, Agent, or Firm* — Cooper & Dunham LLP

(57) ABSTRACT

A power source device includes a main power source circuit, a sub power source circuit whose output voltage is changed when the output voltage of the main power source circuit is changed, a voltage difference detecting circuit which detects whether a voltage difference between the output voltages of the main and sub power source circuits is within a predetermined voltage difference, and a voltage control circuit which controls the output voltages of the main and sub power source circuits based on a voltage changing signal and an output from the voltage difference detecting circuit. The voltage control circuit controls so that the voltage difference between the output voltages of the main and sub power source circuits is within the predetermined voltage difference by controlling output voltage changing speed when the voltage difference between the output voltages of the main and sub power source circuits is over the predetermined voltage difference.

14 Claims, 13 Drawing Sheets

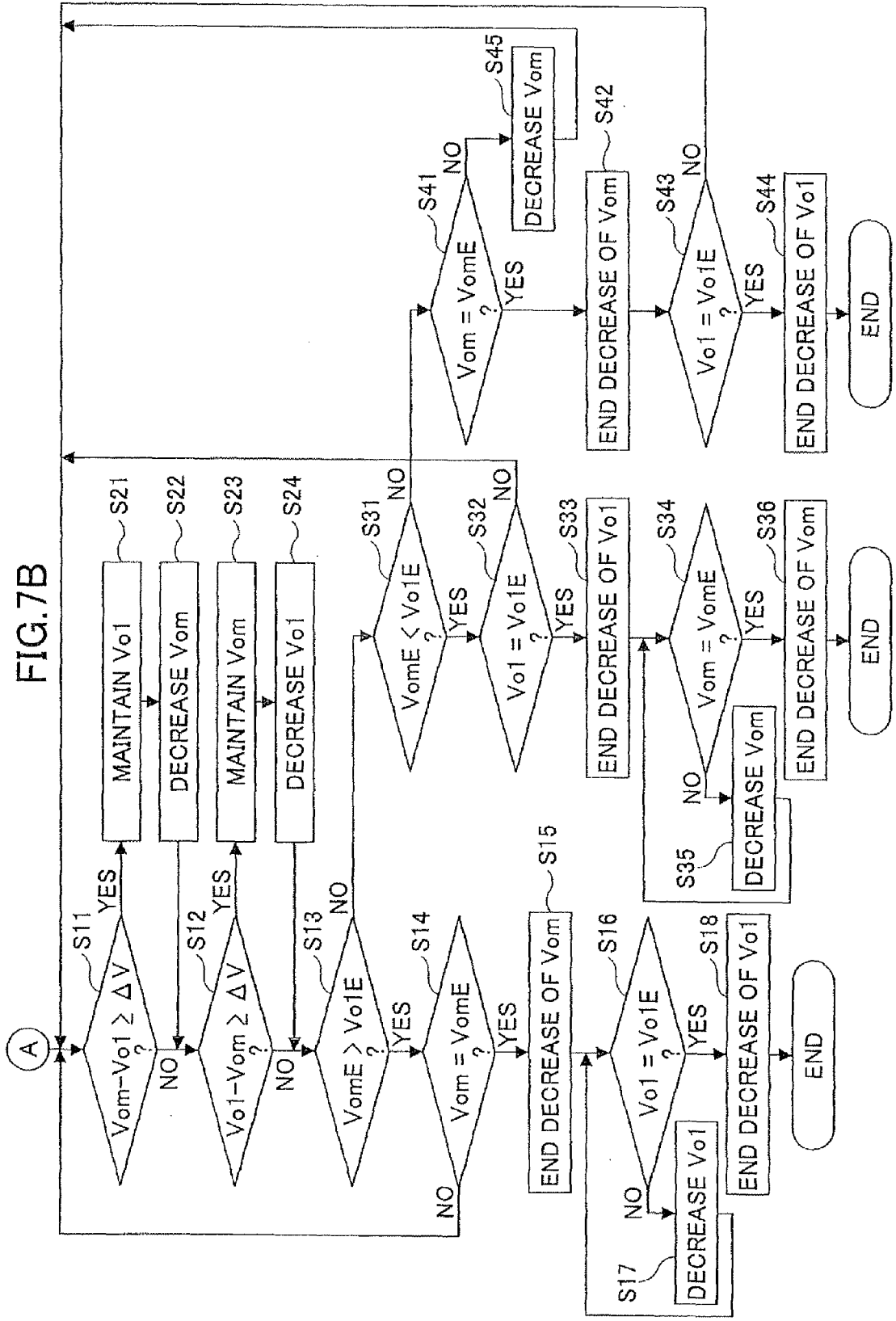

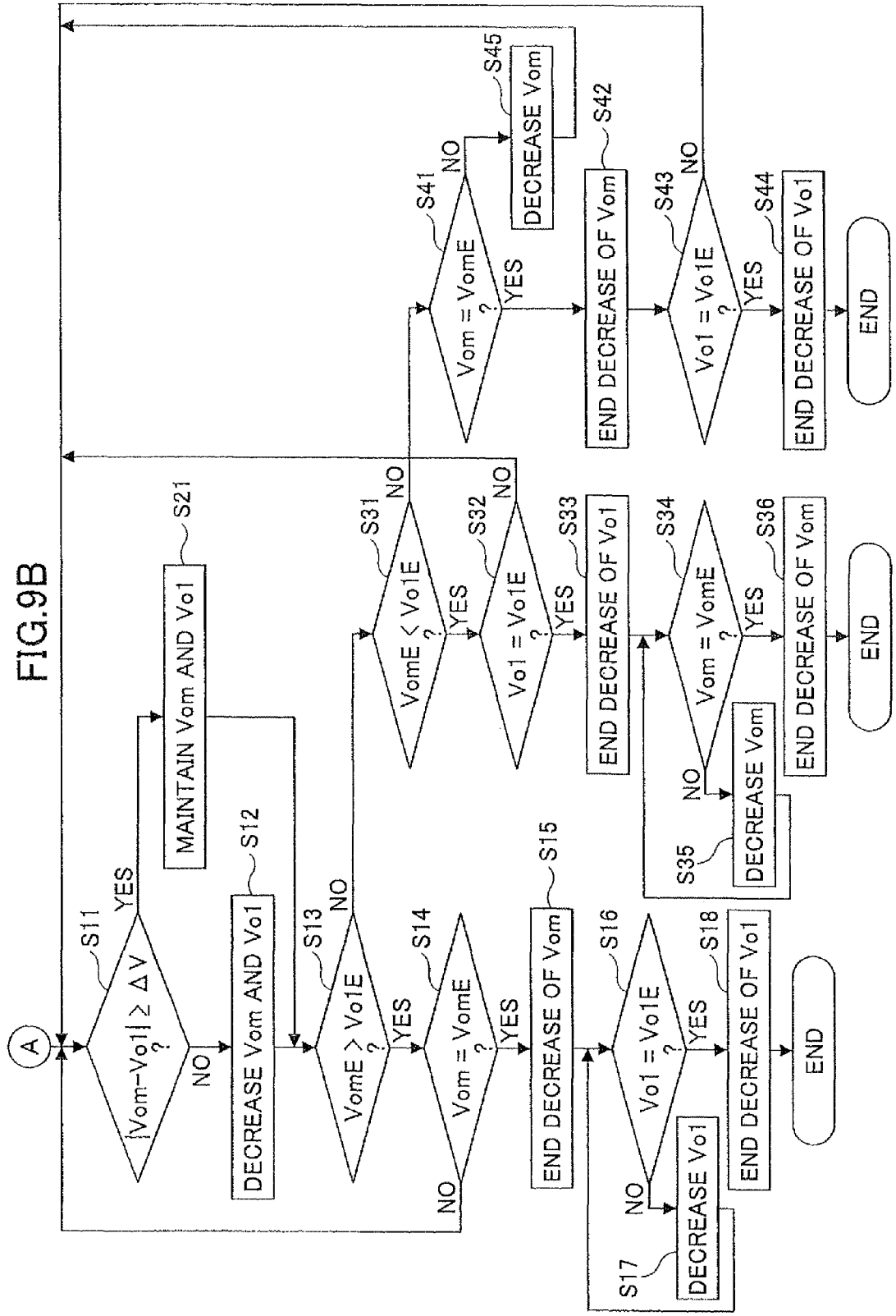

POWER SOURCE DEVICE AND OUTPUT VOLTAGE CHANGING METHOD OF THE POWER SOURCE DEVICE

TECHNICAL FIELD

The present invention generally relates to a power source device and an output voltage changing method of the power source device which is used in an electronic apparatus requiring plural power source circuits, and in particular, in which output voltages from the plural power source circuits are changed by being synchronized with each other.

BACKGROUND ART

Recently, energy saving operations have been required from a view point of environmental measures. In apparatuses using a battery such as a mobile phone and a digital camera, in order to make the battery life long, reduction of the power consumption in the apparatuses has been required.

In addition, an advanced functional apparatus has been developed. For example, instead of recording and reproducing a still image, recording and reproducing a moving image has been frequently performed in the advanced functional apparatus. Consequently, a high-end CPU has been used in the apparatus in which the clock frequency is high. However, when the clock frequency is high, the amount of current to be consumed becomes high. In addition, in order to make the clock frequency high, a high power source voltage is required. As a result, the power consumption becomes high.

In order to solve the above problem, technology for minimizing the power consumption in the apparatus has been developed. In the technology, at a normal operation time, the power source voltage is decreased, the CPU is operated in a low clock frequency, and the power consumption is made to be low; and at high operation time, for example, at a moving image operating time, the power source voltage is increased, and the CPU is operated in a high clock frequency.

In addition, a multifunctional apparatus has been developed, in which since power source voltages are different from each other in many functions in the apparatus, plural power sources having different output voltages are disposed in the apparatus. Further, when a high-speed operation is required, the plural output voltages from the plural power sources must be increased or decreased according to predetermined relationships among the plural output voltages.

As control technology of output voltages of plural power sources, Patent Document 1 discloses a method. In the method, information that changes an output voltage of a main power source is output to a sub power source, and the sub power source determines an output voltage based on the received information.

In Patent Document 2, an output voltage of a sub power source is determined to be proportional to an output voltage of a main power source, and when the output voltage of the main power source is changed, the output voltage of the sub power source is proportionally changed.

[Patent Document 1] Japanese Unexamined Patent Publication No. 2003-304679

[Patent Document 2] Japanese Unexamined Patent Publication No. S58-224562

However, conventionally, only the output voltages are determined, and in the middle of the changes of the output voltages, no control of any kind has been disclosed.

FIG. 5A is a graph showing voltage change characteristics when an output voltage Vom of a main power source circuit and an output voltage Vo1 of a sub power source circuit are increased or decreased. In FIG. 5A, at a low-speed operation time of a load circuit, for example, the output voltage Vom of the main power source circuit is determined to be 0.7 V and the output voltage Vo1 of the sub power source circuit is determined to be 1.1 V. At a high-speed operation time of the load circuit, the output voltage Vom of the main power source and the output voltage Vo1 of the sub power source are increased to 1.4 V. When the operation is returned to the low-speed operation, the output voltage Vom of the main power source circuit is returned to 0.7 V and the output voltage Vo1 of the sub power source circuit is returned to 1.1 V.

In conditions when the output voltages are increased, first, the output voltage Vom (lower than the output voltage Vo1) of the main power source circuit is increased. When the output voltage Vom becomes approximately equal to the output voltage Vo1, the output voltage Vo1 is increased at an approximately equal changing speed to the changing speed of the output voltage Vom. At this time, a difference between the output voltages Vom and Vo1 must be within, for example, 50 mV. In addition, a difference between the output voltages Vom and Vo1 at the target voltage 1.4 V must be within, for example, 50 mV.

FIG. 5B is an enlarged view of a circled part of FIG. 5A. In FIG. 5B, a region sandwiched between alternate one-dot broken lines is the ±50 mV range from the output voltage Vom of the main power source circuit. When the output voltage Vom of the main power source circuit is increased and the difference between the output voltages Vom and Vo1 becomes within the range of ±50 mV, the output voltage Vo1 of the sub power source circuit is started to be increased and is increased at an approximately equal changing speed to the changing speed of the output voltage Vom of the main power source circuit. Therefore, the difference between the output voltages Vom and Vo1 is within the range of ±50 mV until the output voltages Vom and Vo1 reach the target voltage of 1.4 V.

FIG. 5C is another enlarged view of the circled part of FIG. 5A when the changing speed of the output voltage Vom is lowered in the middle of changing due to, for example, an increase of a load current of the main power source circuit. However, since the output voltage Vo1 of the sub power source circuit is increased by the speed approximately equal to the original speed, the output voltage Vo1 of the sub power source circuit becomes higher than the output voltage Vom of the main power source circuit beyond the range of ±50 mV.

In FIG. 5C, the following is not shown; however, when the output voltage Vom of the main power source circuit returns from 1.4 V to 0.7 V and the output voltage Vo1 of the sub power source circuit returns from 1.4 V to 1.1 V, a phenomenon similar to the increasing time occurs.

FIG. 5D is another enlarged view of the circled part of FIG. 5A. FIG. 5D is described below in detail.

SUMMARY OF INVENTION

In embodiments of the present invention, there is provided a power source device and an output voltage changing method of the power source device in which an output voltage difference between a main power source circuit and a sub power source circuit does not exceed a predetermined voltage difference, even if changing speed of an output voltage of the main power source is changed due to, for example, an increase of a load current of the main power source in the middle of changing the output voltage of the main power source circuit.

To achieve one or more of these and other advantages, according to one aspect of the present invention, there is provided a power source device having a main power source circuit whose output voltage is changeable and one or more sub power source circuits whose output voltage is changed in the same changing direction as a changing direction of the output voltage of the main power source circuit when the output voltage of the main power source circuit is changed. The power source device includes a voltage difference detecting circuit which detects whether a voltage difference between the output voltage of the main power source circuit and the output voltage of the sub power source circuit is within a predetermined voltage difference, and a voltage control circuit which controls the output voltage of the main power source circuit and the output voltage of the sub power source circuit based on a voltage changing signal and an output from the voltage difference detecting circuit. The voltage control circuit changes the output voltage of the main power source circuit and the output voltage of the sub power source circuit based on the voltage changing signal, and when the voltage difference detecting circuit detects that the voltage difference between the output voltage of the main power source circuit and the output voltage of the sub power source circuit is more than the predetermined voltage difference, the voltage control circuit controls output voltage changing speeds of the output voltage of the main power source circuit and the output voltage of the sub power source circuit so that the voltage difference between the output voltage of the main power source circuit and the output voltage of the sub power source circuit is within the predetermined voltage difference.

Effect of Invention

According to an embodiment of the present invention, an output voltage of a main power source circuit before being changed and an output voltage of a sub power source circuit before being changed are changed to corresponding target output voltages for a predetermined period. In the middle of the changes, a voltage difference between the output voltages of the main power source circuit and the sub power source circuit is detected. When the voltage difference becomes more than a predetermined voltage difference, changing speeds of one or both of the output voltages of the main power source circuit and the sub power source circuit are controlled. Therefore, even in the middle of the changes of the output voltages of the main power source circuit and the sub power source circuit, the voltage difference between the output voltages of the main power source circuit and the sub power source circuit can be controlled within the predetermined voltage difference.

BRIEF DESCRIPTION OF DRAWINGS

Features and advantages of the present invention will become more apparent from the following detailed description when read in conjunction with the accompanying drawings, in which:

FIG. 7B is a fourth flowchart showing processes in the power source device according to the first embodiment of the present invention;

FIG. 9B is a fourth flowchart showing processes in the power source device according to the second embodiment of the present invention.

MODE(S) FOR CARRYING OUT THE INVENTION

Figure 1:
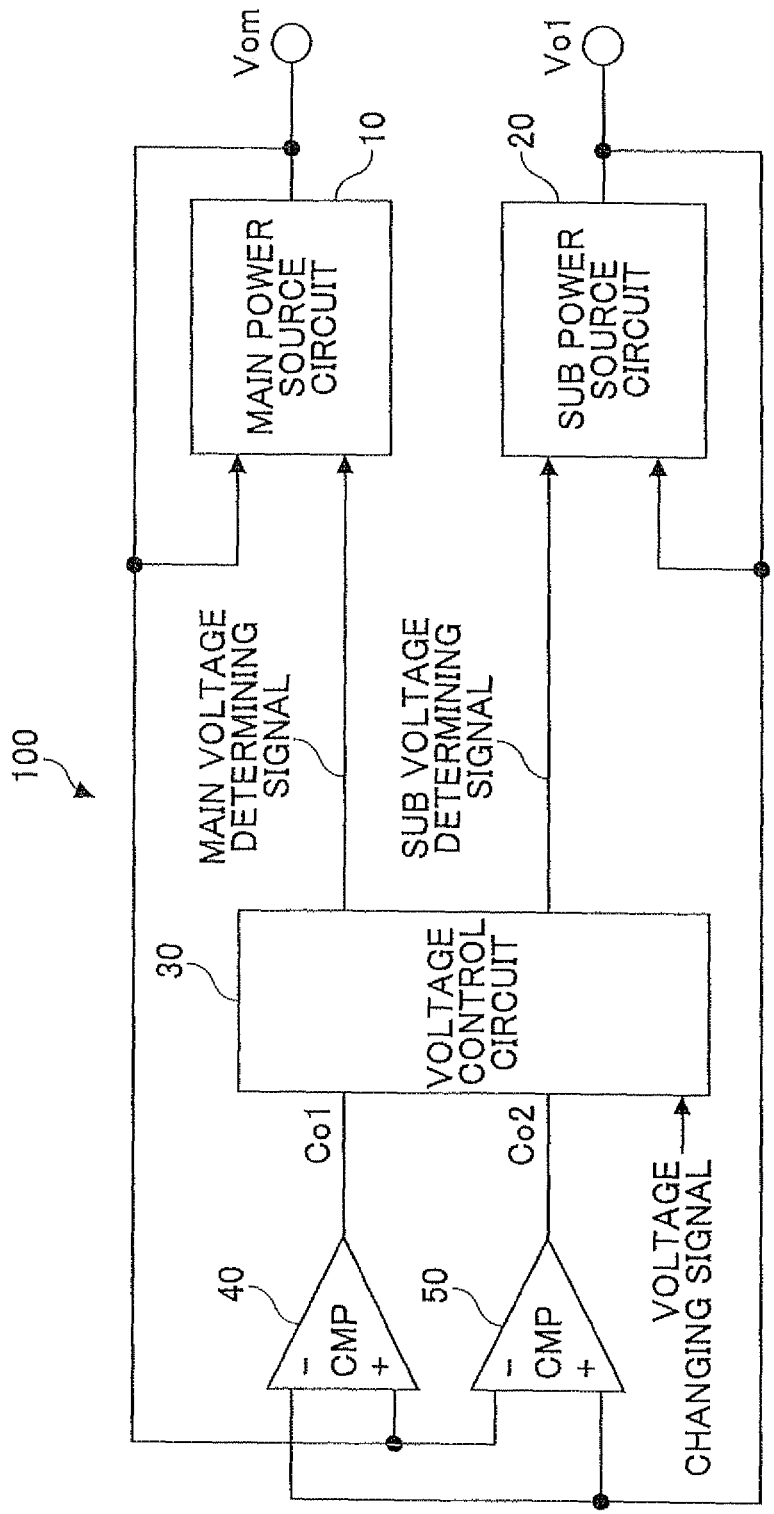
FIG. 1 is a block diagram showing a power source device according to a first embodiment of the present invention.

Referring to the drawings, embodiments of the present invention are described in detail.

First Embodiment

FIG. 1 is a block diagram showing a power source device according to a first embodiment of the present invention. As shown in FIG. 1, a power source device 100 according to the first embodiment of the present invention includes a main power source circuit 10, a sub power source circuit 20, a voltage control circuit 30, a first comparator (CMP) 40, and a second comparator (CMP) 50.

The main power source circuit 10 outputs an output voltage Vom corresponding to a main voltage determining signal output from the voltage control circuit 30.

The sub power source circuit 20 outputs an output voltage Vo1 corresponding to a sub voltage determining signal from the voltage control circuit 30.

The voltage control circuit 30 determines the output voltage Vom of the main power source circuit 10 and the output voltage Vo1 of the sub power source circuit 20 based on corresponding voltage changing signals output from a control circuit (not shown), for example, a CPU (central processing unit), in corresponding device operating modes. An output signal Co1 from the first CMP 40 and an output signal Co2 from the second CMP 50 are input to the voltage control circuit 30, and the voltage control circuit 30 controls the output voltage Vom of the main power source circuit 10 and the output voltage Vo1 of the sub power source circuit 20 based on voltage information in the middle of changing the output voltages Vom and Vo1.

The output voltage Vo1 of the sub power source circuit 20 is input to an inverting input terminal of the first CMP 40, the output voltage Vom of the main power source circuit 10 is input to a non-inverting input terminal of the first CMP 40, and the output signal Co1 is input to the voltage control circuit 30. The first CMP 40 provides a predetermined offset voltage ΔV between the input terminals, and when the output voltage Vom is higher than the output voltage Vo1 by the offset voltage ΔV or more, the first CMP 40 outputs a high level signal.

The output voltage Vo1 of the sub power source circuit 20 is input to a non-inverting input terminal of the second CMP 50, the output voltage Vom of the main power source circuit 10 is input to an inverting input terminal of the second CMP 50, and the output signal Co2 is input to the voltage control circuit 30. The second CMP 50 provides a predetermined offset voltage ΔV between the input terminals, and when the output voltage Vom is lower than the output voltage Vo1 by the offset voltage ΔV or more, the second CMP 50 outputs a high level signal.

The first and second CMPs 40 and 50 form a voltage difference detecting circuit. When the output voltage Vom is higher than the output voltage Vo1 by the predetermined offset voltage ΔV or more, the first CMP 40 outputs the high level signal, and when the output voltage Vom is lower than the output voltage Vo1 by the predetermined offset voltage ΔV or more, the second CMP 50 outputs the high level signal. In addition, when a difference between the output voltages Vom and Vo1 is less than the predetermined offset voltage ΔV, the first and second CMPs 40 and 50 outputs the low level signals.

Figure 2:
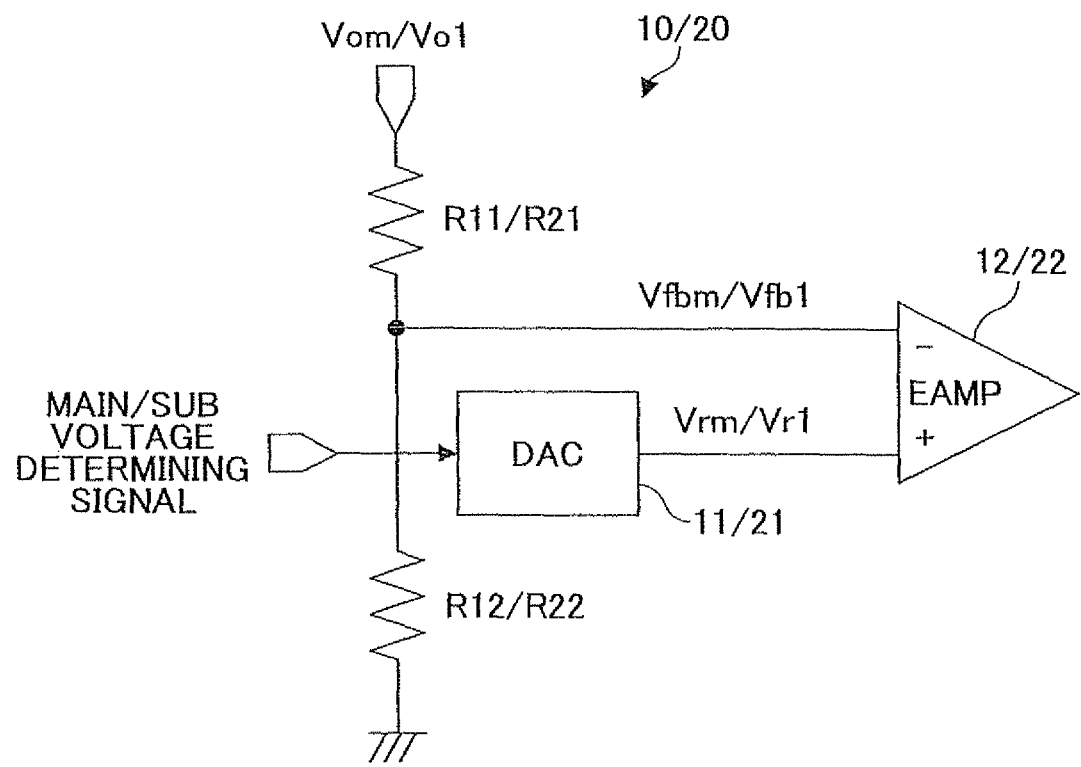
FIG. 2 is a circuit diagram showing a voltage determining circuit of a main power source circuit and a sub power source circuit shown in FIG. 1.

FIG. 2 is a circuit diagram showing a voltage determining circuit of the main power source circuit 10 and the sub power source circuit 20. In FIG. 2, a reference number (reference sign) at the left side of "/" is for the main power source circuit 10, and a reference number at the right side of "/" is for the sub power source circuit 20. That is, the voltage determining circuit of the main power source circuit 10 includes a DAC (digital to analog converter) 11, an EAMP (error amplifying circuit) 12, a resistor R11, and a resistor R12; and the voltage determining circuit of the sub power source circuit 20 includes a DAC 21, an EAMP 22, a resistor R21, and a resistor R22.

The DAC 11 generates a reference voltage Vrm based on the main voltage determining signal, and the DAC 21 generates a reference voltage Vr1 based on the sub voltage determining signal. The reference voltage Vrm is input to a non-inverting input terminal of the EAMP 12, and the reference voltage Vr1 is input to a non-inverting input terminal of the EAMP 22.

The resistors R11 and R12 are connected in series and are connected between an output terminal of the main power source circuit 10 and ground potential; and the resistors R21 and R22 are connected in series and are connected between an output terminal of the sub power source circuit 20 and ground potential. A voltage Vfbm at a connection node of the resistor R11 with the resistor R12 is input to an inverting input terminal of the EAMP 12, and a voltage Vfb1 at a connection node of the resistor R21 with the resistor R22 is input to an inverting input terminal of the EAMP 22.

The resistors R11 and R12 form an output voltage detecting circuit, and the resistors R21 and R22 form an output voltage detecting circuit.

Outputs from the EAMPs 12 and 22 are input to corresponding next stage circuits (not shown) and control the output voltages Vom and Vo1. The main power source circuit 10 and the sub power source circuit 20 can be formed of a series regulator or a switching regulator.

Figure 3:
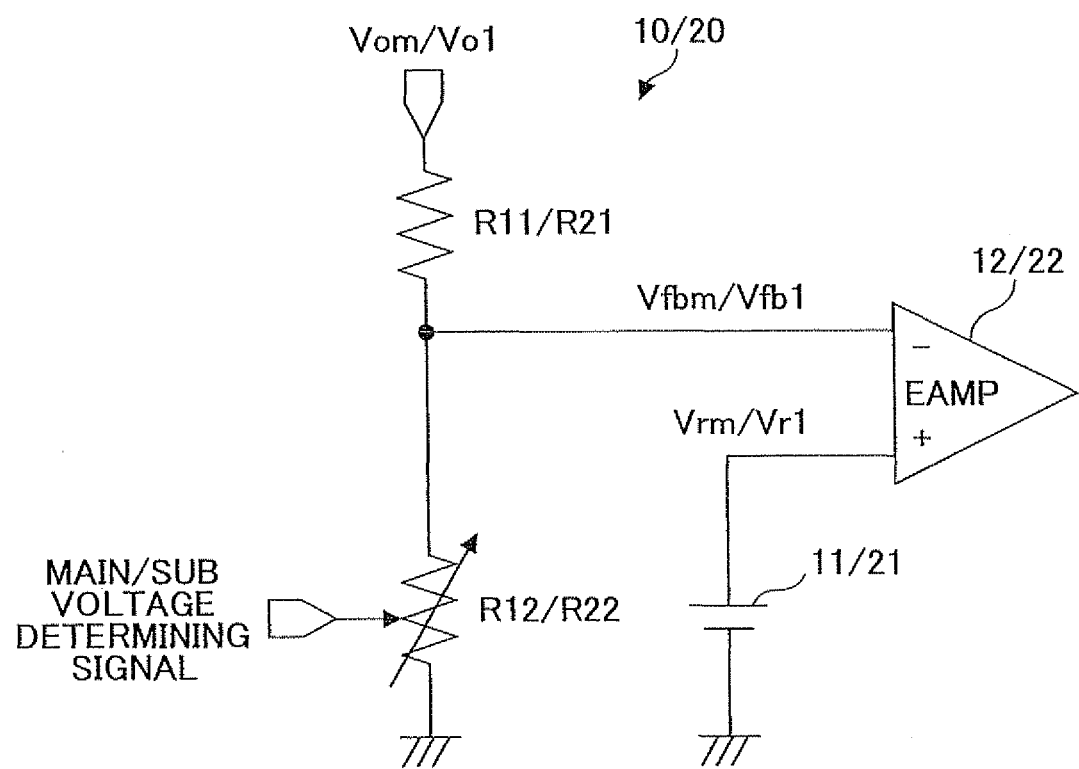
FIG. 3 is a circuit diagram showing another voltage determining circuit of the main power source circuit and the sub power source circuit shown in FIG. 1.

FIG. 3 is a circuit diagram showing another voltage determining circuit of the main power source circuit 10 and the sub power source circuit 20. In FIG. 3, a reference number (reference sign) at the left side of "/" is for the main power source circuit 10, and a reference number at the right side of "/" is for the sub power source circuit 20. When the voltage determining circuit shown in FIG. 3 is compared with the voltage determining circuit shown in FIG. 2, in FIG. 3, the DAC 11 (DAC 12) shown in FIG. 2 is replaced by a reference voltage component 11 (12) which outputs a fixed voltage Vrm (Vr1), and the resistor R12 (R22) is replaced by a variable resistor R12 (R22) whose resistance value is changed based on the main (sub) voltage determining signal.

Next, processes in the power source device 100 are described.

[Processes for Increasing Output Voltages]

Figure 6A:
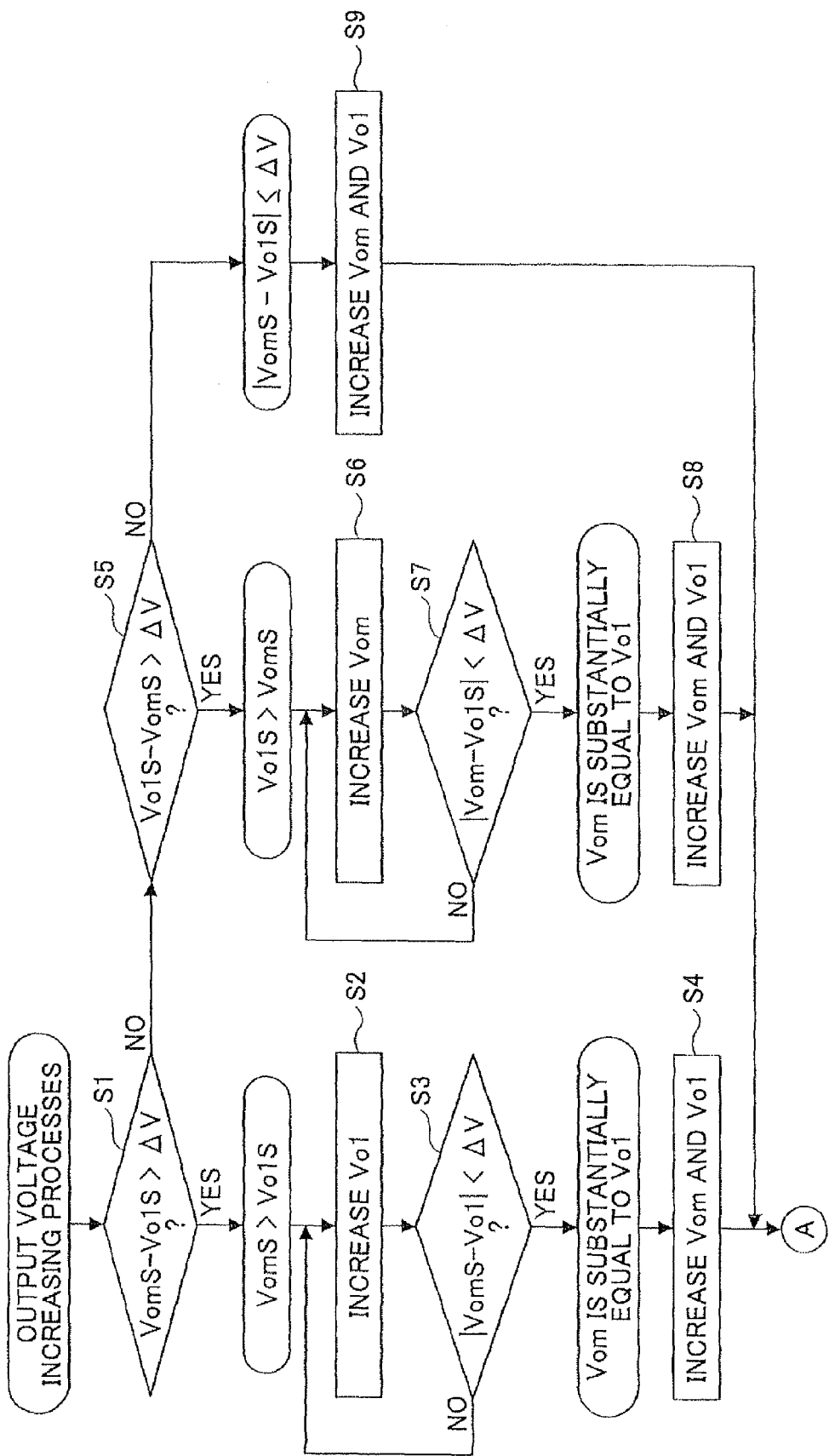
FIG. 6A is a first flowchart showing processes in the power source device according to the first embodiment of the present invention.
Figure 6B:
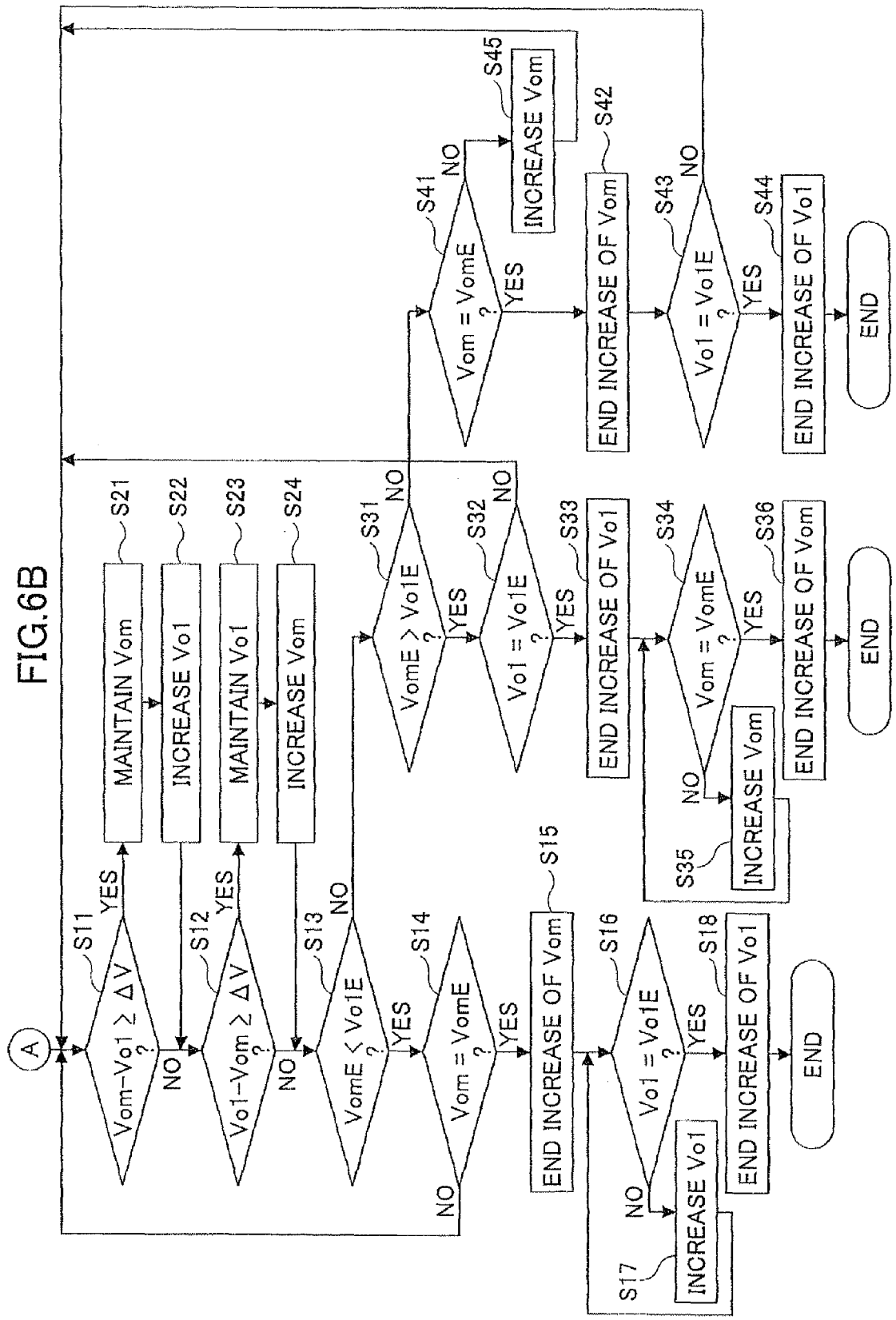
FIG. 6B is a second flowchart showing processes in the power source device according to the first embodiment of the present invention.

FIG. 6A is a first flowchart showing the processes in the power source device 100 according to the first embodiment of the present invention. FIG. 6B is a second flowchart showing the processes in the power source device 100 according to the first embodiment of the present invention. In the first and second flowcharts shown in FIGS. 6A and 6B, a case is described where voltages output from the power source device 100 are increased. In FIGS. 6A and 6B, VomS is an output voltage from the main power source circuit 10 before being changed, Vom is an output voltage from the main power source circuit 10 in the middle of changing, and VomE is a target output voltage from the main power source circuit 10 after being changed. In addition, Vo1S is an output voltage from the sub power source circuit 20 before being changed, Vo1 is an output voltage from the sub power source circuit 20 in the middle of changing, and Vo1E is a target output voltage from the sub power source circuit 20 after being changed. Further, ΔV is a predetermined voltage difference to be detected by the first and second CMP 40 and 50.

Referring to FIGS. 6A and 6B, the processes are described.

First, when a voltage changing signal for increasing the output voltages VomS and Vo1S is input to the voltage control circuit 30, the voltage control circuit 30 compares the output voltage VomS of the main power source circuit 10 before being changed with the output voltage Vo1S of the sub power source circuit 20 before being changed. That is, it is determined whether the output voltage VomS of the main power source circuit 10 before being changed is more than the output voltage Vo1S of the sub power source circuit 20 before being changed by the predetermined voltage difference ΔV (S1).

When the output voltage VomS of the main power source circuit 10 before being changed is more than the output voltage Vo1S of the sub power source circuit 20 before being changed by the predetermined voltage difference ΔV (YES in S1), the output from the first CMP 40 becomes a high level signal.

Since the output voltage VomS is higher than the output voltage Vo1S at the starting time, the voltage control circuit 30 outputs a sub voltage determining signal so that the output voltage Vo1 of the sub power source circuit 20 is increased (S2). At this time, the voltage control circuit 30 controls the output voltage changing speed so that the output voltage Vo1 is gradually increased to the target voltage Vo1E for a predetermined period without immediately increasing the output voltage Vr1 from the DAC 21 shown in FIG. 2 or a value output from the variable resistor R22 shown in FIG. 3 to the target voltage Vo1E. The output voltage Vo1 is increased based on the sub voltage determining signal.

Next, it is determined whether a difference between the output voltage Vo1 in the middle of changing of the sub power source circuit 20 and the output voltage VomS of the main power source circuit 10 before being changed is less than the predetermined voltage difference ΔV (S3). When the output signals from the first and second CMPs 40 and 50 become low level signals, the voltage control circuit 30 determines that a difference between the output voltage Vo1 in the middle of changing of the sub power source circuit 20 and the output voltage VomS of the main power source circuit 10 before being changed is less than the predetermined voltage difference ΔV (YES in S3). That is, it is determined that the output voltage Vo1 becomes substantially equal to the output voltage VomS. Then the process goes to S4.

When a difference between the output voltage Vo1 in the middle of changing of the sub power source circuit 20 and the output voltage VomS of the main power source circuit 10 before being changed is not less than the predetermined voltage difference ΔV (NO in S3), the process returns to S2 and the processes in S2 and S3 are repeated until a difference between the output voltage Vo1 in the middle of changing of the sub power source circuit 20 and the output voltage VomS of the main power source circuit 10 before being changed becomes less than the predetermined voltage difference ΔV by increasing the output voltage Vo1.

Next, the voltage control circuit 30 further outputs the main voltage determining signal and increases the output voltage Vom in the middle of changing of the main power source circuit 10.

At this time, similar to the process in S2, the voltage control circuit 30 controls the output voltage changing speed so that the output voltage Vom is gradually increased by gradually changing the output voltage Vrm from the DAC 11 shown in FIG. 2 or a value output from the variable resistor R12 shown in FIG. 3. The output voltage changing speed of the output voltage Vom is controlled to be approximately equal to the output voltage changing speed of the output voltage Vo1. With this, the output voltages Vom and Vo1 are increased (S4).

During the increases of the output voltages Vom and Vo1, processes from S11 through S14 are performed. In S11, it is determined whether the output voltage Vom is more than the output voltage Vo1 by the predetermined voltage difference ΔV or more. When the output voltage Vom is more than the output voltage Vo1 by the predetermined voltage difference ΔV or more (YES in S11), the output from the first CMP 40 becomes a high level signal. Then the voltage control circuit 30 stops increasing the output voltage Vom by interrupting a change of an output from the DAC 11 or the variable resistor R12 with the control of the main voltage determining signal (S21). That is, the output voltage Vom is maintained. Next, when the increase of the output voltage Vo1 is stopped, the increase of the output voltage Vo1 is restarted (S22).

After S22 or when the output voltage Vom is not more than the output voltage Vo1 by the predetermined voltage difference ΔV or more (NO in S11), it is determined whether the output voltage Vo1 is more than the output voltage Vom by the predetermined voltage difference ΔV or more (S12). When the output voltage Vo1 is more than the output voltage Vom by the predetermined voltage difference ΔV or more (YES in S12), the output from the second CMP 50 becomes a high level signal. Then the voltage control circuit 30 stops increasing the output voltage Vo1 by interrupting a change of an output from the DAC 21 or the variable resistor R22 with the control of the sub voltage determining signal (S23). That is, the output voltage Vo1 is maintained. Next, when the increase of the output voltage Vom is stopped, the increase of the output voltage Vom is restarted (S24).

After S24 or when the output voltage Vo1 is not more than the output voltage Vom by the predetermined voltage difference ΔV or more (NO in S12), it is determined whether the target output voltage VomE is less than the target output voltage Vo1E (S13). When the target output voltage VomE is less than the target output voltage Vo1E (YES in S13), it is determined whether the output voltage Vom becomes the target output voltage VomE (S14). When the output voltage Vom does not become the target output voltage VomE (NO in S14), the process returns to S11, and the processes from S11 through S14 are repeated. When the output voltage Vom becomes the target output voltage VomE (YES in S14), the increase of the output voltage Vom ends (S15).

Next, it is determined whether the output voltage Vo1 becomes the target output voltage Vo1E (S16). When the output voltage Vo1 does not become the target output voltage Vo1E (NO in S16), the output voltage Vo1 is increased (S17), and the process returns to S16. When the output voltage Vo1 becomes the target output voltage Vo1E (YES in S16), the increase of the output voltage Vo1 ends (S18). By the above processes, the output voltage Vom becomes the target output voltage VomE and the output voltage Vo1 becomes the target output voltage Vo1E.

Returning to S13, when the target output voltage VomE is not less than the target output voltage Vo1E (NO in S13), it is determined whether the target output voltage VomE is more than the target output voltage Vo1E (S31). When the target output voltage VomE is more than the target output voltage Vo1E (YES in S31), it is determined whether the output voltage Vo1 becomes the target output voltage Vo1E (S32). When the output voltage Vo1 becomes the target output voltage Vo1E (YES in S32), the increase of the output voltage Vo1 ends (S33). When the output voltage Vo1 does not become the target output voltage Vo1E (NO in S32), the process returns to S11.

Next, it is determined whether the output voltage Vom becomes the target output voltage VomE (S34). When the output voltage Vom does not become the target output voltage VomE (NO in S34), the output voltage Vom is increased (S35), and the process returns to S34. When the output voltage Vom becomes the target output voltage VomE (YES in S34), the increase of the output voltage VOm ends (S36). With this, the output voltage Vom becomes the target output voltage VomE and the output voltage Vo1 becomes the target output voltage Vo1E.

Returning to S31, when the target output voltage VomE is not more than the target output voltage Vo1E (NO in S31), it is determined whether the output voltage Vom is equal to the target output voltage VomE (S41). When the output voltage Vom is not equal to the target output voltage VomE (NO in S41), the output voltage Vom is increased (S45), and the process returns to S11.

When the output voltage Vom is equal to the target output voltage VomE (YES in S41), the increase of the output voltage Vom ends (S42). Then it is determined whether the output voltage Vo1 becomes the target output voltage Vo1E (S43). When the output voltage Vo1 does not become the target output voltage Vo1E (NO in S43), the process returns to S11. When the output voltage Vo1 becomes the target output voltage Vo1E (YES in S43), the increase of the output voltage Vo1 ends (S44).

Next, returning to S1, when the output voltage VomS of the main power source circuit 10 before being changed is not more than the output voltage Vo1S of the sub power source circuit 20 before being changed by the predetermined voltage difference ΔV (NO in S1), the output from the first CMP 40 becomes a low level signal. Then it is determined whether the output voltage Vo1S of the sub power source circuit 20 before being changed is more than the output voltage VomS of the main power source circuit 10 before being changed by the predetermined voltage difference ΔV (S5).

When the output voltage Vo1S of the sub power source circuit 20 before being changed is more than the output voltage VomS of the main power source circuit 10 before being changed by the predetermined voltage difference ΔV (YES in S5), the output from the second CMP 50 becomes a high level signal.

Next, the voltage control circuit 30 outputs a main voltage determining signal so as to increase the output voltage VomS of the main power source circuit 10 and increase the output voltage Vom (S6). At this time, similar to the process in S2, the voltage control circuit 30 controls the output voltage changing speed so that the output voltage Vom is gradually increased by gradually changing the output voltage Vrm from the DAC 11 shown in FIG. 2 or a value output from the variable resistor R12 shown in FIG. 3.

Next, it is determined whether a difference between the output voltage Vom of the main power source circuit 10 and the output voltage Vo1S of the sub power source circuit 20 before being changed is less than the predetermined voltage difference ΔV (S7).

When the output signals from the first and second CMPs 40 and 50 become low level signals, the voltage control circuit 30 determines that a difference between the output voltage Vom of the main power source circuit 10 and the output voltage Vo1S of the sub power source circuit 20 before being changed is less than the predetermined voltage difference ΔV (YES in S7). That is, it is determined that the output voltage Vom becomes substantially equal to the output voltage Vo1S. Then the process goes to S8.

When a difference between the output voltage Vom of the main power source circuit 10 and the output voltage Vo1S of the sub power source circuit 20 before being changed is more than the predetermined voltage difference ΔV (NO in S7), the process returns to S6, and the voltage control circuit 30 outputs a main voltage determining signal and increases the output voltage Vom, and repeats the processes in S6 and S7 until a difference between the output voltage Vom of the main power source circuit 10 and the output voltage Vo1S of the sub power source circuit 20 before being changed is less than the predetermined voltage difference ΔV.

Then the voltage control circuit 30 further outputs a sub voltage determining signal and increases the output voltage Vo1. At this time, similar to the process in S6, the voltage control circuit 30 controls the output voltage changing speed so that the output voltage Vo1 is gradually increased by gradually changing the output voltage Vr1 from the DAC 21 shown in FIG. 2 or a value output from the variable resistor R22 shown in FIG. 3. The changing speed of the output voltage Vo1 is controlled to be approximately equal to the changing speed of the output voltage Vom. With this, the output voltages Vom and Vo1 are increased (S8).

During the increases of the output voltages Vom and Vo1, the processes from S11 through S14 described above are performed.

Returning to S5, when the output voltage Vo1S of the sub power source circuit 20 before being changed is not more than the output voltage VomS of the main power source circuit 10 before being changed by the predetermined voltage difference ΔV (NO in S5), since the difference between the output voltages Vo1S and VomS is within the predetermined voltage difference ΔV, the output signals from the first and second CMPs 40 and 50 are low level signals. Then the voltage control circuit 30 increases the output voltages Vom and Vo1 with the same changing speed (S9). During the increases of the output voltages Vom and Vo1, the processes from S11 through S14 described above are performed.

As described above, in the middle of the increases of the output voltages Vom and Vo1, when the difference between the output voltages Vom and Vo1 becomes the predetermined voltage difference ΔV or more, the first and second CMPs 40 and 50 (the voltage difference detecting circuit) work to stop increasing one of the output voltages Vom and Vo1 whose voltage is higher than the other, and work to wait until the other becomes high. With this, the maximum value of the difference between the output voltages Vom and Vo1 can be maintained within the predetermined voltage difference ΔV.

Figure 5A:
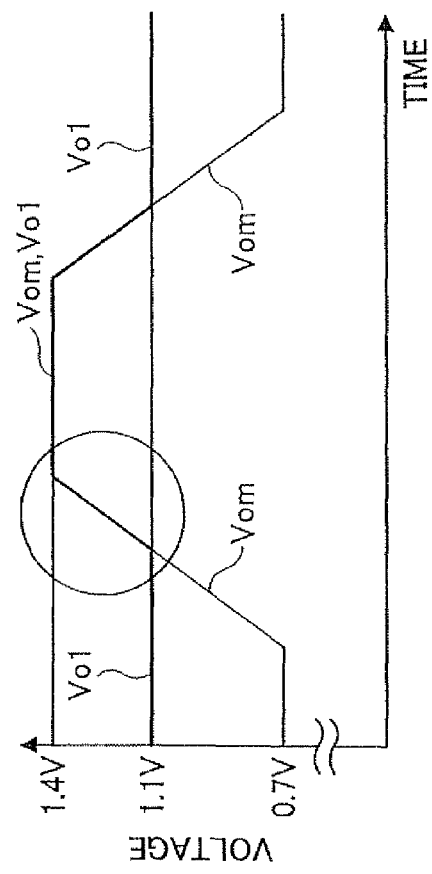
FIG. 5A is a graph showing voltage change characteristics when an output voltage of the main power source circuit and an output voltage of the sub power source circuit are increased or decreased.
Figure 5D:
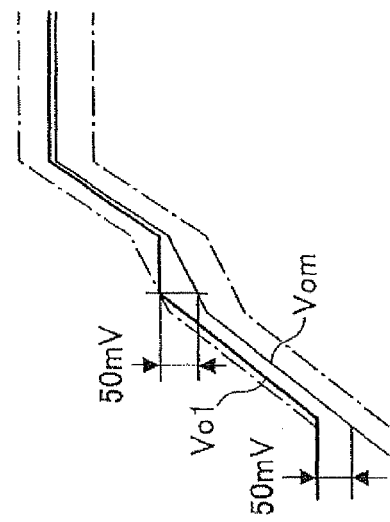
FIG. 5D is another enlarged view of the circled part of FIG. 5A in which the first embodiment of the present invention is applied.
Figure 5C:
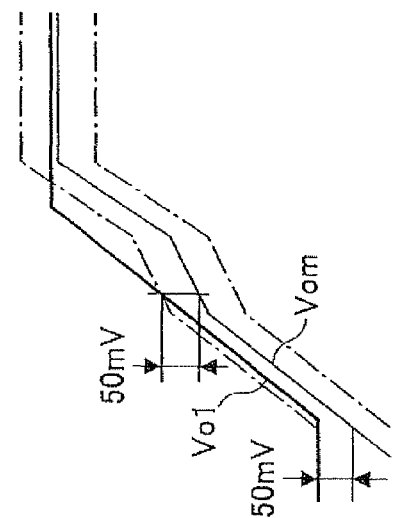
FIG. 5C is another enlarged view of the circled part of FIG. 5A when changing speed of the output voltage of the main power source circuit is lowered in the middle of changing.
Figure 5B:
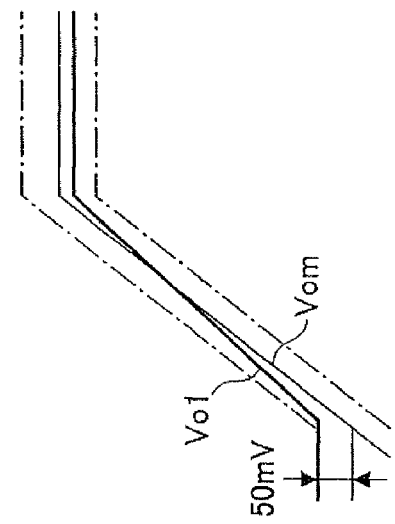
FIG. 5B is an enlarged view of a circled part of FIG. 5A.

FIG. 5D is another enlarged view of the circled part of FIG. 5A in which the first embodiment of the present invention is applied. In FIG. 5D, a region sandwiched between alternate one-dot broken lines is the ±50 mV range from the output voltage Vom of the main power source circuit 10. As shown in FIG. 5D, when the increasing speed of the output voltage Vom is lowered due to a non-identified reason and the output voltage Vo1 becomes a voltage higher than the output voltage Vom by the predetermined voltage difference ΔV (50 mV) or more, the increase of the output voltage Vo1 is stopped and enters a standby status until the output voltage Vom becomes high.

When the predetermined voltage difference ΔV is determined to be a value slightly less than an actual allowable voltage difference between the output voltages Vom and Vo1, the predetermined voltage difference ΔV can work well.

In S21, the increase of the output voltage Vom is stopped; however, in some cases, without stopping the increase of the output voltage Vom, it is possible that the increasing speed of the output voltage Vom is decreased. In addition, in S23, the increase of the output voltage Vo1 is stopped; however, in some cases, without stopping the increase of the output voltage Vo1, it is possible that the increasing speed of the output voltage Vo1 is decreased.

In addition, in S22, when the increase of the output voltage Vom is stopped in S21, the output voltage Vo1 is increased; however, in some cases, it is possible that the increasing speed of the output voltage Vo1 is increased. Further, in S24, when the increase of the output voltage Vo1 is stopped in S23, the output voltage Vom is increased; however, in some cases, it is possible that the increasing speed of the output voltage Vom is increased.

[Processes for Decreasing Output Voltages]

Figure 7A:
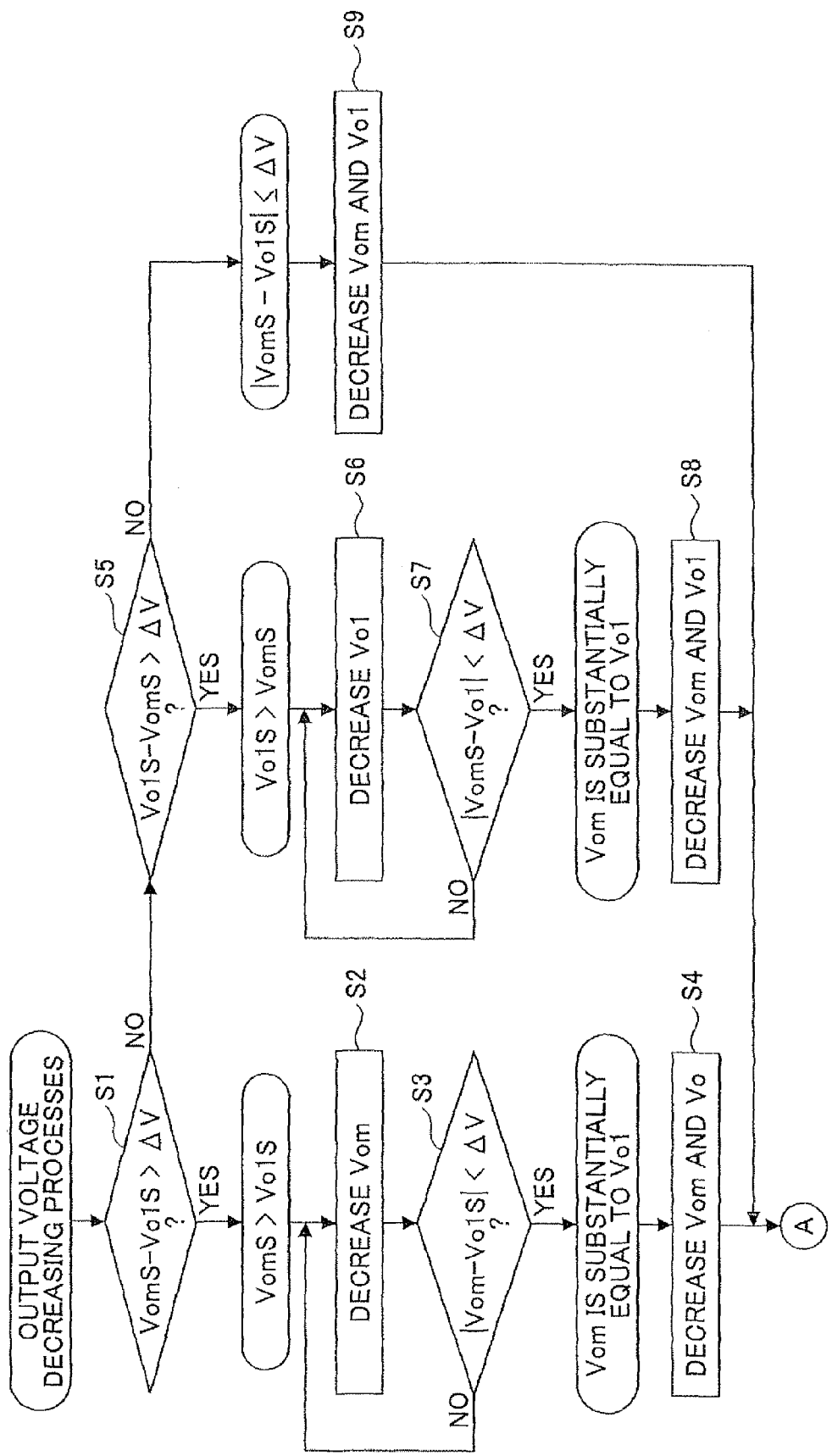
FIG. 7A is a third flowchart showing processes in the power source device according to the first embodiment of the present invention.

FIG. 7A is a third flowchart showing the processes in the power source device 100 according to the first embodiment of the present invention. FIG. 7B is a fourth flowchart showing the processes in the power source device 100 according to the first embodiment of the present invention. In the third and fourth flowcharts shown in FIGS. 7A and 7B, a case is described where voltages output from the power source device 100 are decreased. In FIGS. 7A and 7B, step numbers are the same as those shown in FIGS. 6A and 6B. However, in FIGS. 7A and 7B, in some cases, the contents of the process of the step number are different from the contents of the step number shown in FIGS. 6A and 6B.

Referring to FIGS. 7A and 7B, the processes are described.

First, when a voltage changing signal for decreasing the output voltages VomS and Vo1S is input to the voltage control circuit 30, the output voltage VomS of the main power source circuit 10 before being changed is compared with the output voltage Vo1S of the sub power source circuit 20 before being changed. That is, it is determined whether the output voltage VomS of the main power source circuit 10 before being changed is more than the output voltage Vo1S of the sub power source circuit 20 before being changed by the predetermined voltage difference $\Delta V$ (S1).

When the output voltage VomS of the main power source circuit 10 before being changed is more than the output voltage Vo1S of the sub power source circuit 20 before being changed by the predetermined voltage difference $\Delta V$ (YES in S1), the output from the first CMP 40 becomes a high level signal.

Since the output voltage VomS is higher than the output voltage Vo1S at the starting time, the voltage control circuit 30 outputs a main voltage determining signal so that the output voltage VomS of the main power source circuit 10 is decreased (S2). That is, the voltage control circuit 30 decreases the output voltage Vom (S2). At this time, similar to the case where the output voltage is increased shown in FIG. 6A, the voltage control circuit 30 controls the output voltage changing speed so that the output voltage Vom is gradually decreased to the target voltage VomE for a predetermined period without immediately determining the output voltage Vrm from the DAC 11 shown in FIG. 2 or a value output from the variable resistor R12 shown in FIG. 3 to the target voltage VomE.

Next, it is determined whether a difference between the output voltage Vom in the middle of changing of the main power source circuit 10 and the output voltage Vo1S of the sub power source circuit 20 before being changed is less than the predetermined voltage difference $\Delta V$ (S3). When the outputs from the first and second CMPs 40 and 50 become low level signals, the voltage control circuit 30 determines that a difference between the output voltage Vom in the middle of changing of the main power source circuit 10 and the output voltage Vo1S of the sub power source circuit 20 before being changed is less than the predetermined voltage difference $\Delta V$ (YES in S3). That is, it is determined that the output voltage Vom is substantially equal to the output voltage Vo1S. Then the voltage control circuit 30 decreases the output voltages Vom and Vo1 (S4).

When a difference between the output voltage Vom in the middle of changing of the main power source circuit 10 and the output voltage Vo1S of the sub power source circuit 20 before being changed is not less than the predetermined voltage difference $\Delta V$ (NO in S3), the process returns to S2 and the processes in S2 and S3 are repeated until a difference between the output voltage Vom in the middle of changing of the main power source circuit 10 and the output voltage Vo1S of the sub power source circuit 20 before being changed becomes less than the predetermined voltage difference $\Delta V$ by decreasing the output voltage Vom.

Next, the voltage control circuit 30 further outputs the sub voltage determining signal and decreases the output voltage Vo1 in the middle of changing of the sub power source circuit 20. At this time, similar to the process in S2, the voltage control circuit 30 controls the output voltage changing speed so that the output voltage Vo1 is gradually decreased by gradually changing the output voltage Vr1 from the DAC 21 shown in FIG. 2 or a value output from the variable resistor R22 shown in FIG. 3. The output voltage changing speed of the output voltage Vo1 is controlled to be approximately equal to the output voltage changing speed of the output voltage Vom. With this, the output voltages Vom and Vo1 are decreased (S4).

During the decreases of the output voltages Vom and Vo1, processes from S11 through S14 are performed. In S11, it is determined whether the output voltage Vom is more than the output voltage Vo1 by the predetermined voltage difference $\Delta V$ or more. When the output voltage Vom is more than the output voltage Vo1 by the predetermined voltage difference $\Delta V$ or more (YES in S11), the output from the first CMP 40 becomes a high level signal. Then the voltage control circuit 30 stops decreasing the output voltage Vo1 by interrupting a change of an output from the DAC 21 or the variable resistor R22 with the control of the sub voltage determining signal (S21). That is, the output voltage Vo1 is maintained. Next, when the decrease of the output voltage Vom is stopped, the decrease of the output voltage Vom is restarted (S22).

After S22 or when the output voltage Vom is not more than the output voltage Vo1 by the predetermined voltage difference $\Delta V$ or more (NO in S11), it is determined whether the output voltage Vo1 is more than the output voltage Vom by the predetermined voltage difference $\Delta V$ or more (S12). When the output voltage Vo1 is more than the output voltage Vom by the predetermined voltage difference $\Delta V$ or more (YES in S12), the output from the second CMP 50 becomes a high level signal. Then the voltage control circuit 30 stops decreasing the output voltage Vom by interrupting a change of an output from the DAC 11 or the variable resistor R12 with the control of the main voltage determining signal (S23). That is, the output voltage Vom is maintained. Next, when the decrease of the output voltage Vo1 is stopped, the decrease of the output voltage Vo1 is restarted (S24).

After S24 or when the output voltage Vo1 is not more than the output voltage Vom by the predetermined voltage difference $\Delta V$ or more (NO in S12), it is determined whether the target output voltage VomE is more than the target output voltage Vo1E (S13). When the target output voltage VomE is more than the target output voltage Vo1E (YES in S13), it is determined whether the output voltage Vom becomes the target output voltage VomE (S14). When the output voltage Vom does not become the target output voltage VomE (NO in S14), the process returns to S11, and the processes from S11 through S14 are repeated. When the output voltage Vom becomes the target output voltage VomE (YES in S14), the decrease of the output voltage Vom ends (S15).

Next, it is determined whether the output voltage Vo1 becomes the target output voltage Vo1E (S16). When the output voltage Vo1 does not become the target output voltage Vo1E (NO in S16), the output voltage Vo1 is decreased (S17), and the process returns to S16. When the output voltage Vo1 becomes the target output voltage Vo1E (YES in S16), the decrease of the output voltage Vo1 ends (S18). By the above processes, the output voltage Vom becomes the target output voltage VomE and the output voltage Vo1 becomes the target output voltage Vo1E.

Returning to S13, when the target output voltage VomE is not more than the target output voltage Vo1E (NO in S13), it is determined whether the target output voltage VomE is less than the target output voltage Vo1E (S31). When the target output voltage VomE is less than the target output voltage Vo1E (YES in S31), it is determined whether the output voltage Vo1 becomes the target output voltage Vo1E (S32). When the output voltage Vo1 becomes the target output voltage Vo1E (YES in S32), the decrease of the output voltage Vo1 ends (S33). When the output voltage Vo1 does not become the target output voltage Vo1E (NO in S32), the process returns to S11.

Next, it is determined whether the output voltage Vom becomes the target output voltage VomE (S34). When the output voltage Vom does not become the target output voltage VomE (NO in S34), the output voltage Vom is decreased (S35), and the process returns to S34. When the output voltage Vom becomes the target output voltage VomE (YES in S34), the decrease of the output voltage VOm ends (S36). With this, the output voltage Vom becomes the target output voltage VomE and the output voltage Vo1 becomes the target output voltage Vo1E.

Returning to S31, when the target output voltage VomE is not less than the target output voltage Vo1E (NO in S31), it is determined whether the output voltage Vom is equal to the target output voltage VomE (S41). When the output voltage Vom is not equal to the target output voltage VomE (NO in S41), the output voltage Vom is decreased (S45), and the process returns to S11.

When the output voltage Vom is equal to the target output voltage VomE (YES in S41), the decrease of the output voltage Vom ends (S42). Then it is determined whether the output voltage Vo1 becomes the target output voltage Vo1E (S43). When the output voltage Vo1 does not become the target output voltage Vo1E (NO in S43), the process returns to S11. When the output voltage Vo1 becomes the target output voltage Vo1E (YES in S43), the decrease of the output voltage Vo1 ends (S44).

Next, returning to S1, when the output voltage VomS of the main power source circuit 10 before being changed is not more than the output voltage Vo1S of the sub power source circuit 20 before being changed by the predetermined voltage difference ΔV (NO in S1), the output from the first CMP 40 becomes a low level signal. Then it is determined whether the output voltage Vo1S of the sub power source circuit 20 before being changed is more than the output voltage VomS of the main power source circuit 10 before being changed by the predetermined voltage difference ΔV (S5).

When the output voltage Vo1S of the sub power source circuit 20 before being changed is more than the output voltage VomS of the main power source circuit 10 before being changed by the predetermined voltage difference ΔV (YES in S5), the output from the second CMP 50 becomes a high level signal.

Next, the voltage control circuit 30 outputs a sub voltage determining signal so as to decrease the output voltage Vo1S of the sub power source circuit 20 and decreases the output voltage Vo1 (S6). At this time, similar to the process in S2, the voltage control circuit 30 controls the output voltage changing speed so that the output voltage Vo1 is gradually decreased by gradually changing the output voltage Vr1 from the DAC 21 shown in FIG. 2 or a value output from the variable resistor R22 shown in FIG. 3.

Next, it is determined whether a difference between the output voltage VomS before being changed of the main power source circuit 10 and the output voltage Vo1 of the sub power source circuit 20 is less than the predetermined voltage difference ΔV (S7). When the output signals from the first and second CMPs 40 and 50 become low level signals, the voltage control circuit 30 determines that a difference between the output voltage VomS of the main power source circuit 10 and the output voltage Vo1 of the sub power source circuit 20 is less than the predetermined voltage difference ΔV (YES in S7). That is, it is determined that the output voltage VomS becomes substantially equal to the output voltage Vo1. Then the process goes to S8.

When a difference between the output voltage VomS of the main power source circuit 10 and the output voltage Vo1 of the sub power source circuit 20 is more than the predetermined voltage difference ΔV (NO in S7), the process returns to S6, and the voltage control circuit 30 outputs a sub voltage determining signal and decreases the output voltage Vo1, and repeats the processes in S6 and S7 until a difference between the output voltage VomS of the main power source circuit 10 and the output voltage Vo1 of the sub power source circuit 20 is less than the predetermined voltage difference ΔV.

Then the voltage control circuit 30 further outputs a main voltage determining signal and decreases the output voltage Vom. At this time, similar to the process in S6, the voltage control circuit 30 controls the output voltage changing speed so that the output voltage Vom is gradually decreased by gradually changing the output voltage Vrm from the DAC 11 shown in FIG. 2 or a value output from the variable resistor R12 shown in FIG. 3. The changing speed of the output voltage Vom is controlled to be approximately equal to the changing speed of the output voltage Vo1. With this, the output voltages Vom and Vo1 are decreased (S8).

During the decreases of the output voltages Vom and Vo1, the processes from S11 through S14 described above are performed.

Returning to S5, when the output voltage Vo1S of the sub power source circuit 20 before being changed is not more than the output voltage VomS of the main power source circuit 10 before being changed by the predetermined voltage difference ΔV or more (NO in S5), since the difference between the output voltages Vo1S and VomS is within the predetermined voltage difference ΔV, the output signals from the first and second CMPs 40 and 50 are low level signals. Then the voltage control circuit 30 decreases the output voltages Vom and Vo1 with the same changing speed (S9). During the decreases of the output voltages Vom and Vo1, the processes from S11 through S14 described above are performed.

As described above, in the middle of the decreases of the output voltages Vom and Vo1, when the difference between the output voltages Vom and Vo1 becomes the predetermined voltage difference ΔV or more, the first and second CMPs 40 and 50 (the voltage difference detecting circuit) work to stop decreasing one of the output voltages Vom and Vo1 whose voltage is lower than the other, and work to wait until the other becomes low. With this, the maximum value of the difference between the output voltages Vom and Vo1 can be maintained within the predetermined voltage difference ΔV.

When the predetermined voltage difference ΔV is determined to be a value slightly less than an actual allowable voltage difference between the output voltages Vom and Vo1, the predetermined voltage difference ΔV can work well.

In S21, the decrease of the output voltage Vom is stopped; however, in some cases, without stopping the decrease of the output voltage Vom, it is possible that the decreasing speed of the output voltage Vom is decreased. In addition, in S23, the decrease of the output voltage Vo1 is stopped; however, in some cases, without stopping the decrease of the output voltage Vo1, it is possible that the decreasing speed of the output voltage Vo1 is decreased.

In addition, in S22, when the decrease of the output voltage Vom is stopped in S21, the output voltage Vo1 is decreased; however, in some cases, it is possible that the decreasing speed of the output voltage Vo1 is decreased. Further, in S24, when the decrease of the output voltage Vo1 is stopped in S23, the output voltage Vom is decreased; however, in some cases, it is possible that the decreasing speed of the output voltage Vom is decreased.

Second Embodiment

Next, referring to the drawings, a second embodiment of the present invention is described.

Figure 4:
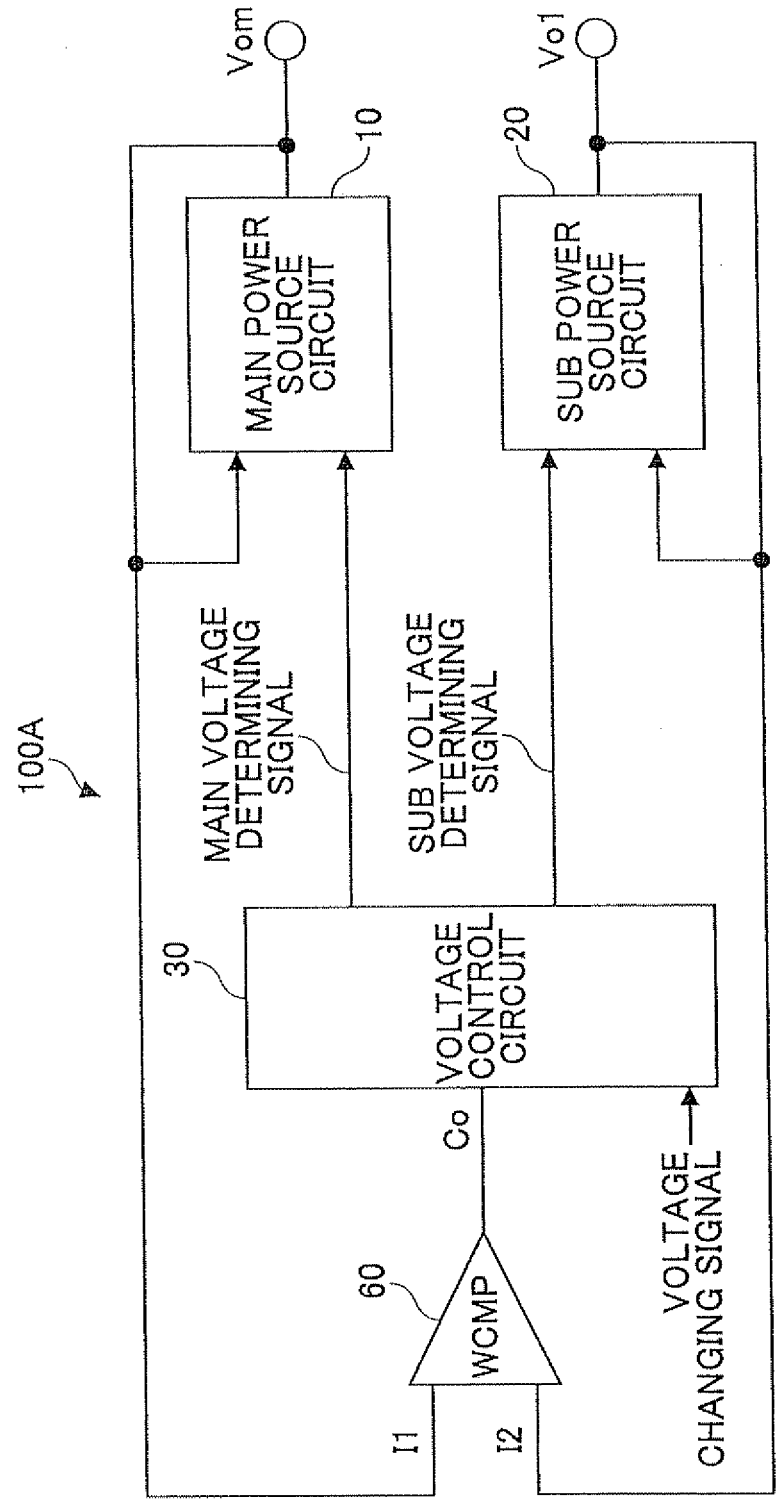
FIG. 4 is a block diagram showing a power source device according to a second embodiment of the present invention.

FIG. 4 is a block diagram showing a power source device according to the second embodiment of the present invention. In FIG. 4, when an element is similar to or the same as that shown in FIG. 1, the same reference number as that shown in FIG. 1 is used for the element, and the same description as that related to FIG. 1 is omitted.

As shown in FIG. 4, a power source device 100A according to the second embodiment of the present invention includes a main power source circuit 10, a sub power source circuit 20, a voltage control circuit 30, and a window comparator (WCMP) 50. When the block diagram shown in FIG. 4 is compared with the block diagram shown in FIG. 1, in FIG. 4, the first and second CMPs 40 and 50 shown in FIG. 1 are replaced by the WCPM 60.

As shown in FIG. 4, an output voltage Vom of the main power source circuit 10 is input to a first input terminal I1 of the WCMP 60, and an output voltage Vo1 of the sub power source circuit 20 is input to a second input terminal I2 of the WCMP 60. In addition, an output signal Co from the WCMP 60 is input to the voltage control circuit 30.

A predetermined offset voltage ΔV is set between the first and second input terminals I1 and I2 of the WCMP 60. When a voltage difference between the output voltages Vom and Vo1 is less than the predetermined offset voltage ΔV, the WCMP 60 outputs a high level signal, and when the voltage difference is the predetermined offset voltage ΔV or more, the WCMP 60 outputs a low level signal.

Next, processes in the power source device 100A are described.

[Processes for Increasing Output Voltages]

Figure 8A:
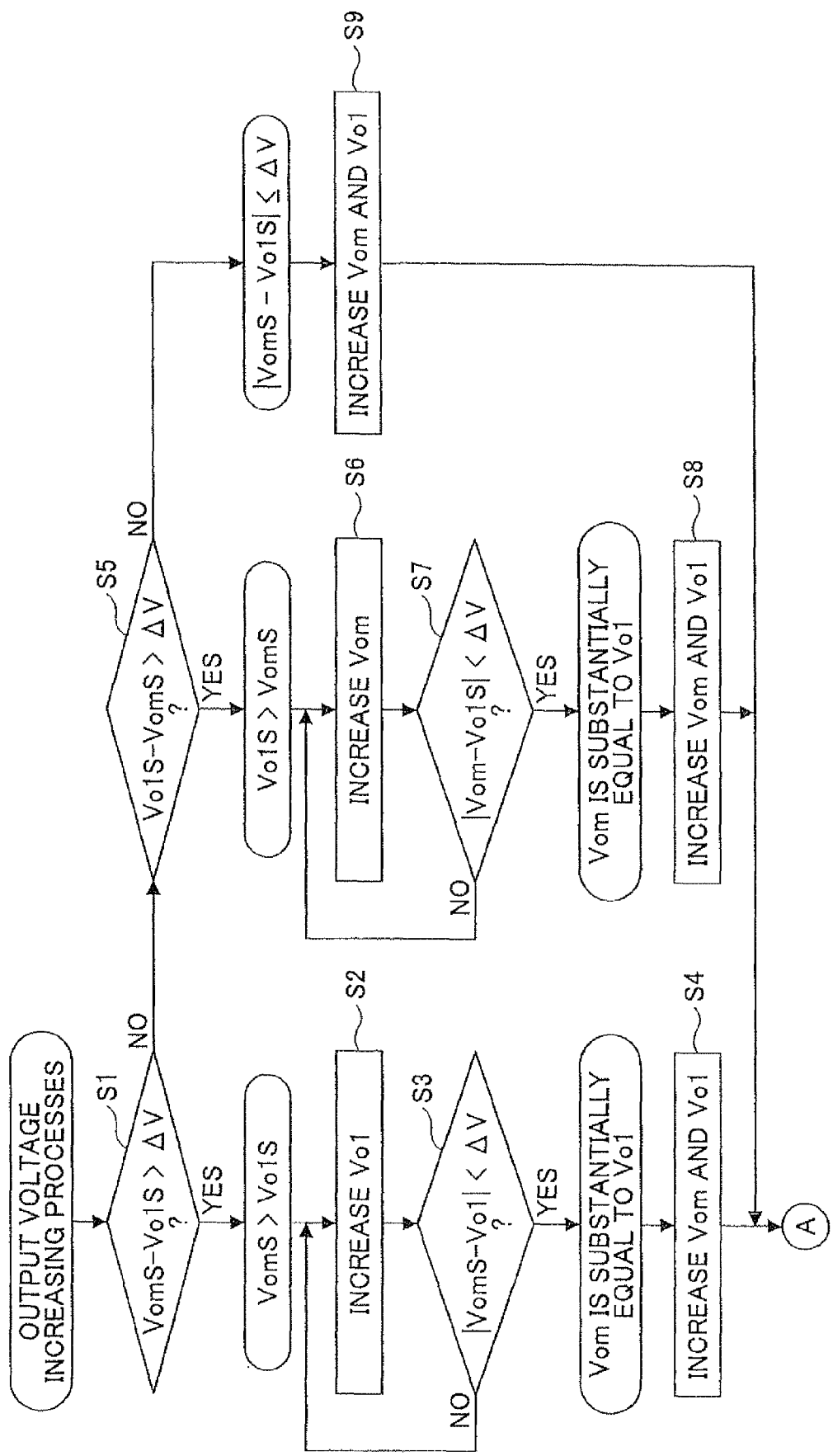
FIG. 8A is a first flowchart showing processes in the power source device according to the second embodiment of the present invention.
Figure 8B:
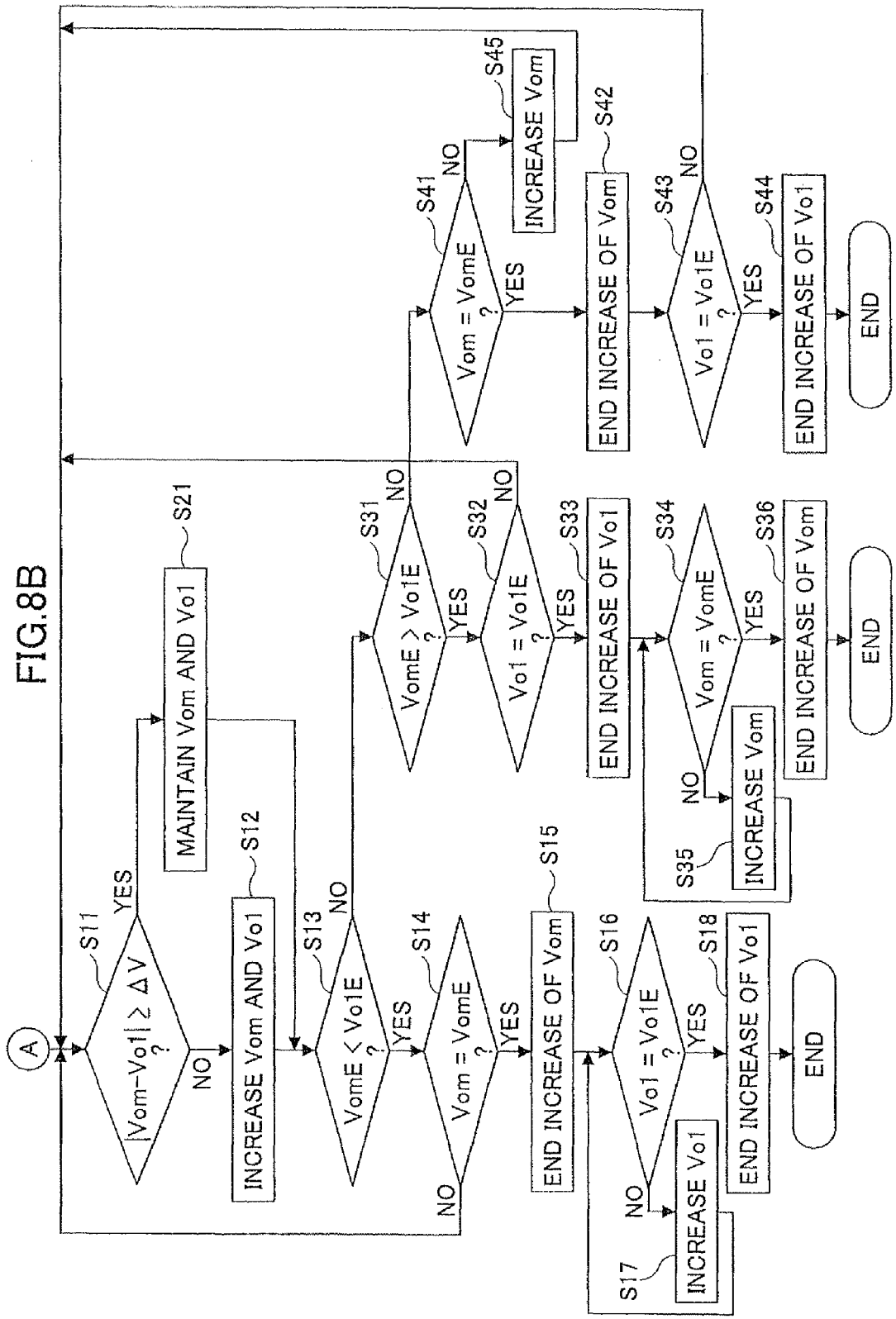
FIG. 8B is a second flowchart showing processes in the power source device according to the second embodiment of the present invention.

FIG. 8A is a first flowchart showing the processes in the power source device 100A according to the second embodiment of the present invention. FIG. 8B is a second flowchart showing the processes in the power source device 100A according to the second embodiment of the present invention. In the first and second flowcharts shown in FIGS. 8A and 8B, a case is described where voltages output from the power source device 100A are increased.

In FIGS. 8A and 8B, as a step number, the step number as that shown in FIGS. 6A and 6B is used; however, in some cases, contents of the step (process) is different from those in FIGS. 6A and 6B.

Referring to FIGS. 8A and 8B, the processes are described.

First, when a voltage changing signal for increasing the output voltages VomS and Vo1S is input to the voltage control circuit 30, the output voltage VomS of the main power source circuit 10 before being changed is compared with the output voltage Vo1S of the sub power source circuit 20 before being changed. That is, it is determined whether the output voltage VomS of the main power source circuit 10 before being changed is more than the output voltage Vo1S of the sub power source circuit 20 before being changed by the predetermined voltage difference ΔV (S1).

When the output from the WCMP 60 is a low level signal, the output voltage VomS of the main power source circuit 10 before being changed is more than the output voltage Vo1S of the sub power source circuit 20 before being changed by the predetermined voltage difference ΔV (YES in S1).

In this case, since the output voltage VomS is higher than the output voltage Vo1S at the starting time, the voltage control circuit 30 outputs a sub voltage determining signal so that the output voltage Vo1 of the sub power source circuit 20 is increased (S2). As described in the first embodiment of the present invention, the voltage control circuit 30 outputs the sub voltage determining signal so that the output voltage Vo1 is gradually increased to the target voltage Vo1E.

Next, it is determined whether a difference between the output voltage Vo1 in the middle of changing of the sub power source circuit 20 and the output voltage VomS of the main power source circuit 10 before being changed is less than the predetermined voltage difference ΔV (S3). When the output from the WCMP 60 becomes a high level signal, the voltage control circuit 30 determines that a difference between the output voltage Vo1 in the middle of changing of the sub power source circuit 20 and the output voltage VomS of the main power source circuit 10 before being changed is less than the predetermined voltage difference ΔV (YES in S3). That is, it is determined that the output voltage Vo1 becomes substantially equal to the output voltage VomS. Then the process goes to S4.

When a difference between the output voltage Vo1 in the middle of changing of the sub power source circuit 20 and the output voltage VomS of the main power source circuit 10 before being changed is the predetermined voltage difference ΔV or more (NO in S3), the process returns to S2 and the processes in S2 and S3 are repeated until a difference between the output voltage Vo1 in the middle of changing of the sub power source circuit 20 and the output voltage VomS of the main power source circuit 10 before being changed becomes less than the predetermined voltage difference ΔV by increasing the output voltage Vo1. At this time, the voltage control circuit 30 outputs a sub voltage determining signal to the sub power source circuit 20 and increases the output voltage Vo1.

Next, the voltage control circuit 30 further outputs the main voltage determining signal and increases the output voltage Vom in the middle of changing of the main power source circuit 10. At this time, the output voltage changing speed of the output voltage Vom is controlled to be approximately equal to the output voltage changing speed of the output voltage Vo1. Similar to the process in S2, the voltage control circuit 30 gradually changes the output voltage Vrm from the DAC 11 shown in FIG. 2 or a value output from the variable resistor R12 shown in FIG. 3. With this, the output voltages Vom and Vo1 are increased (S4).

During the increases of the output voltages Vom and Vo1, processes from S11 through S14 are performed.

In S11, it is determined whether a difference between the output voltage Vom and the output voltage Vo1 is the predetermined voltage difference ΔV or more. When the difference between the output voltage Vom and the output voltage Vo1 is the predetermined voltage difference ΔV or more (YES in S11), the output from the WCMP 60 becomes a low level signal. Then the voltage control circuit 30 stops increasing the output voltage Vom by interrupting a change of an output from the DAC 11 or the variable resistor R12 with the control of the main voltage determining signal and stops increasing the output voltage Vo1 by interrupting a change of an output from the DAC 21 or the variable resistor R22 with the control of the sub voltage determining signal (S21). That is, the output voltages Vom and Vo1 are maintained.

Returning to S11, when the difference between the output voltage Vom and the output voltage Vo1 is less than the predetermined voltage difference ΔV (NO in S11), the process goes to S12. When the increases of the output voltages Vom and Vo1 are stopped, the increases of the output voltages Vom and Vo1 are restarted (S12).

The processes from S13 through S18, the processes from S31 through S36, and the processes from S41 through S45 are the same as those described by using FIGS. 6A and 6B; therefore, the descriptions of the above processes are omitted.

Next, returning to S1, when the output from the WCMP 60 is a low level signal and the difference between the output voltage VomS of the main power source circuit 10 before being changed and the output voltage Vo1S of the sub power source circuit 20 before being changed is not more than the predetermined voltage difference ΔV (NO in S1), it is determined whether the output voltage Vo1S of the sub power source circuit 20 before being changed is more than the output voltage VomS of the main power source circuit 10 before being changed by the predetermined voltage difference ΔV (S5).

When the output voltage Vo1S of the sub power source circuit 20 before being changed is more than the output voltage VomS of the main power source circuit 10 before being changed by the predetermined voltage difference ΔV (YES in S5), the voltage control circuit 30 outputs a main voltage determining signal so as to increase the output voltage VomS of the main power source circuit 10 and increase the output voltage Vom (S6). At this time, similar to the process in S2, the voltage control circuit 30 gradually increases the output voltage Vom to the target output voltage VomE for a predetermined period.

Next, it is determined whether a difference between the output voltage Vom of the main power source circuit 10 and the output voltage Vo1S of the sub power source circuit 20 before being changed is less than the predetermined voltage difference ΔV (S7).

When the output from the WCMP 60 becomes a high level signal, the voltage control circuit 30 determines that a difference between the output voltage Vom of the main power source circuit 10 and the output voltage Vo1S of the sub power source circuit 20 before being changed is less than the predetermined voltage difference ΔV (YES in S7). That is, it is determined that the output voltage Vom becomes substantially equal to the output voltage Vo1S. Then the process goes to S8.

When a difference between the output voltage Vom of the main power source circuit 10 and the output voltage Vo1S of the sub power source circuit 20 before being changed is the predetermined voltage difference ΔV (NO in S7), the process returns to S6, and the voltage control circuit 30 outputs a main voltage determining signal and increases the output voltage Vom, and repeats the processes in S6 and S7 until a difference between the output voltage Vom of the main power source circuit 10 and the output voltage Vo1S of the sub power source circuit 20 before being changed becomes less than the predetermined voltage difference ΔV.

Then the voltage control circuit 30 further outputs a sub voltage determining signal and increases the output voltage Vo1. At this time, similar to the process in S6, the voltage control circuit 30 gradually changes the output voltage Vr1 from the DAC 21 shown in FIG. 2 or a value output from the variable resistor R22 shown in FIG. 3. The changing speed of the output voltage Vo1 is controlled to be approximately equal to the changing speed of the output voltage Vom. With this, the output voltages Vom and Vo1 are increased (S8). During the increases of the output voltages Vom and Vo1, the processes from S11 through S14 are performed.

Returning to S5, when the output from the WCMP 60 is a high level signal; that is, when a difference between the output voltage Vo1S of the sub power source circuit 20 before being changed and the output voltage VomS of the main power source circuit 10 before being changed is not more than the predetermined voltage difference ΔV (NO in S5), similar to the processes in S2 and S6, the voltage control circuit 30 increases the output voltages Vom and Vo1 with the same changing speed (S9). During the increases of the output voltages Vom and Vo1, the processes from S11 through S14 described above are performed.

As described above, in the middle of the increases of the output voltages Vom and Vo1, when the output from the WCMP 60 (the voltage difference detecting circuit) becomes a low level signal, the voltage control circuit 30 detects that the difference between the output voltages Vom and Vo1 becomes the predetermined voltage difference ΔV or more. Then the voltage control circuit 30 temporarily stops the increases of the output voltages Vom and Vo1. After this, when the output from the WCMP 60 becomes a high level signal, the voltage control circuit 30 detects that the difference between the output voltages Vom and Vo1 becomes within the predetermined voltage difference ΔV. Then the voltage control circuit 30 restarts to increase the output voltages Vom and Vo1. With this, the maximum value of the difference between the output voltages Vom and Vo1 can be maintained within the predetermined voltage difference ΔV.

Similar to in the first embodiment of the present invention, in the second embodiment of the present invention, when the predetermined voltage difference ΔV is determined to be a value slightly less than an actual allowable voltage difference between the output voltages Vom and Vo1, the predetermined voltage difference ΔV can work well.

[Processes for Decreasing Output Voltages]

Figure 9A:
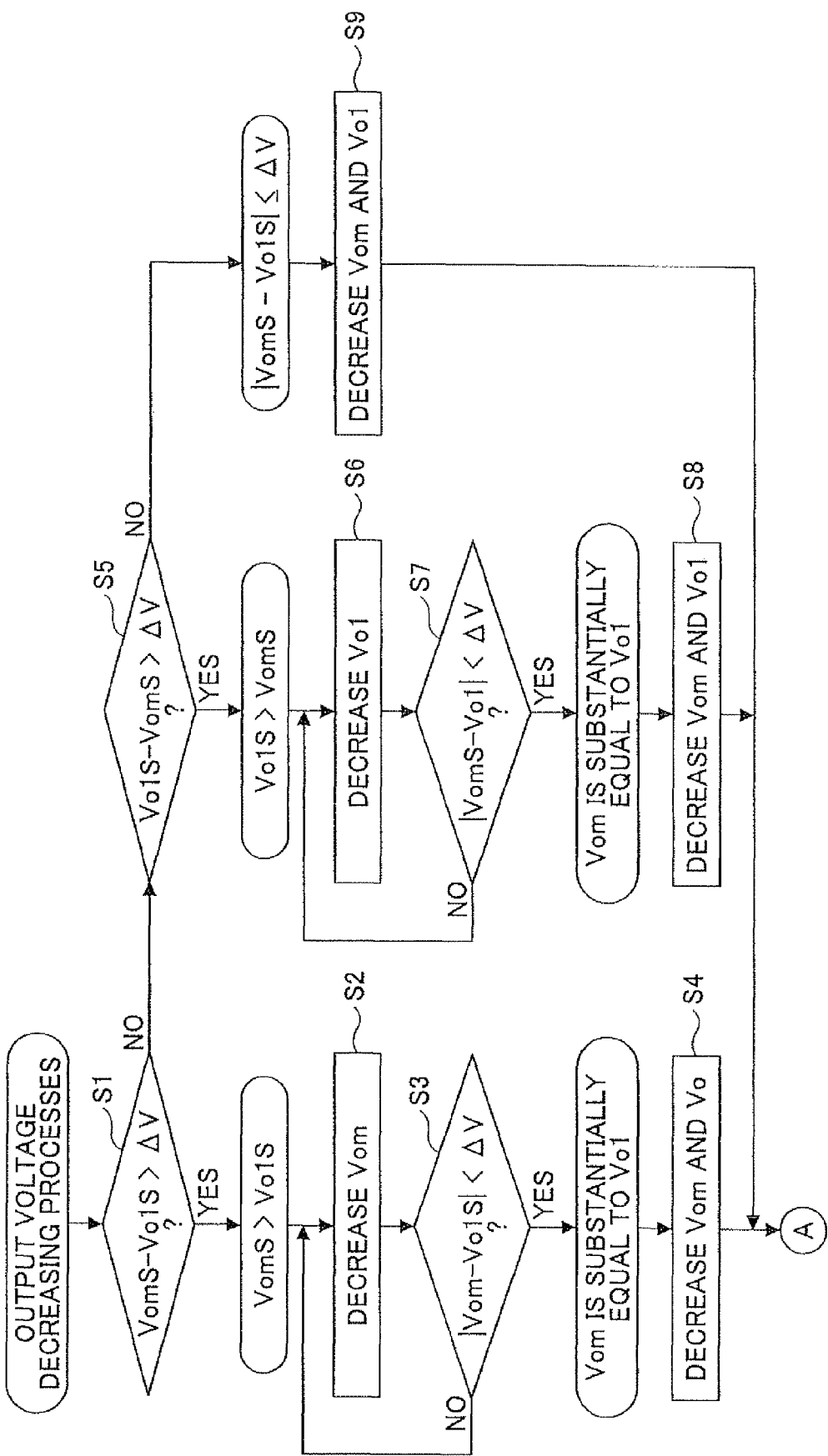
FIG. 9A is a third flowchart showing processes in the power source device according to the second embodiment of the present invention.

FIG. 9A is a third flowchart showing the processes in the power source device 100A according to the second embodiment of the present invention. FIG. 9B is a fourth flowchart showing the processes in the power source device 100A according to the second embodiment of the present invention. In the third and fourth flowcharts shown in FIGS. 9A and 9B, a case is described where voltages output from the power source device 100A are decreased.

In FIGS. 9A and 9B, as a step number, the step number as that shown in FIGS. 8A and 8B is used; however, in some cases, contents of the step (process) is different from those in FIGS. 8A and 8B Referring to FIGS. 9A and 9B, the processes are described.

First, when a voltage changing signal for decreasing the output voltages VomS and Vo1S is input to the voltage control circuit 30, the output voltage VomS of the main power source circuit 10 before being changed is compared with the output voltage Vo1S of the sub power source circuit 20 before being changed. That is, it is determined whether a difference between the output voltage VomS of the main power source circuit 10 before being changed and the output voltage Vo1S of the sub power source circuit 20 before being changed is more than the predetermined voltage difference ΔV (S1).

When the output from the WCMP 60 is a low level signal, the difference between the output voltage VomS of the main power source circuit 10 before being changed and the output voltage Vo1S of the sub power source circuit 20 before being changed is the predetermined voltage difference ΔV or more.

In this case, since the output voltage VomS is higher than the output voltage Vo1S at the starting time (YES in S1), the voltage control circuit 30 outputs a main voltage determining signal so that the output voltage Vom of the main power source circuit 10 is decreased (S2). As described above, the voltage control circuit 30 outputs the main voltage determining signal so that the output voltage Vom is gradually decreased to the target voltage VomE.

Next, it is determined whether a difference between the output voltage Vom in the middle of changing of the main power source circuit 10 and the output voltage Vo1S of the sub power source circuit 20 before being changed is less than the predetermined voltage difference ΔV (S3). When the output from the WCMP 60 becomes a high level signal, the voltage control circuit 30 determines that a difference between the output voltage Vom in the middle of changing of the main power source circuit 10 and the output voltage Vo1S of the sub power source circuit 20 before being changed is less than the predetermined voltage difference ΔV (YES in S3). That is, it is determined that the output voltage Vom becomes substantially equal to the output voltage Vo1S. Then the process goes to S4.

When a difference between the output voltage Vom in the middle of changing of the main power source circuit 10 and the output voltage Vo1S of the sub power source circuit 20 before being changed is the predetermined voltage difference ΔV or more (NO in S3), the process returns to S2 and the processes in S2 and S3 are repeated until a difference between the output voltage Vom in the middle of changing of the main power source circuit 10 and the output voltage Vo1S of the sub power source circuit 20 before being changed becomes less than the predetermined voltage difference ΔV by decreasing the output voltage Vom. At this time, the voltage control circuit 30 outputs a main voltage determining signal to the main power source circuit 10 and decreases the output voltage Vom.

Next, the voltage control circuit 30 further outputs the sub voltage determining signal and decreases the output voltage Vo1 in the middle of changing of the sub power source circuit 20. At this time, the output voltage changing speed of the output voltage Vo1 is controlled to be approximately equal to the output voltage changing speed of the output voltage Vom. Similar to the process in S2, the voltage control circuit 30 gradually changes the output voltage Vr1 from the DAC 21 shown in FIG. 2 or a value output from the variable resistor R22 shown in FIG. 3. With this, the output voltage Vom and the output voltage Vo1 are decreased (S4).

During the decreases of the output voltages Vom and Vo1, processes from S11 through S14 are performed.

In S11, it is determined whether a difference between the output voltage Vom and the output voltage Vo1 is the predetermined voltage difference ΔV or more. When the difference between the output voltage Vom and the output voltage Vo1 is the predetermined voltage difference ΔV or more (YES in S11), the output from the WCMP 60 becomes a low level signal. Then the voltage control circuit 30 stops decreasing the output voltage Vom by interrupting a change of an output from the DAC 11 or the variable resistor R12 with the control of the main voltage determining signal and stops decreasing the output voltage Vo1 by interrupting a change of an output from the DAC 21 or the variable resistor R22 with the control of the sub voltage determining signal (S21). That is, the output voltages Vom and Vo1 are maintained.

Returning to S11, when the difference between the output voltage Vom and the output voltage Vo1 is less than the predetermined voltage difference ΔV (NO in S11), the process goes to S12. When the decreases of the output voltages Vom and Vo1 are stopped, the decreases of the output voltages Vom and Vo1 are restarted (S12).

The processes from S13 through S18, the processes from S31 through S36, and the processes from S41 through S45 are the same as those described by using FIGS. 7A and 7B; therefore, the descriptions of the above processes are omitted.

Next, returning to S1, when the output signal from the WCMP 60 is a low level signal and it is not that VomS>Vo1S (NO in S1), it is determined whether the output voltage Vo1S of the sub power source circuit 20 before being changed is more than the output voltage VomS of the main power source circuit 10 before being changed by the predetermined voltage difference ΔV (S5).

When the output voltage Vo1S of the sub power source circuit 20 before being changed is more than the output voltage VomS of the main power source circuit 10 before being changed by the predetermined voltage difference ΔV (YES in S5), the voltage control circuit 30 outputs a sub voltage determining signal so as to decrease the output voltage Vo1 of the sub power source circuit 20 and decreases the output voltage Vo1 (S6). At this time, similar to the process in S2, the voltage control circuit 30 gradually decreases the output voltage Vo1 to the target output voltage Vo1E for a predetermined period.

Next, it is determined whether a difference between the output voltage Vo1 of the sub power source circuit 20 and the output voltage VomS of the main power source circuit 10 before being changed is less than the predetermined voltage difference ΔV (S7).

When the output from the WCMP 60 becomes a high level signal, the voltage control circuit 30 determines that a difference between the output voltage Vo1 of the sub power source circuit 20 and the output voltage VomS of the main power source circuit 10 before being changed is less than the predetermined voltage difference ΔV (YES in S7). That is, it is determined that the output voltage VomS becomes substantially equal to the output voltage Vo1. Then the process goes to S8.

When a difference between the output voltage VomS of the main power source circuit 10 before being changed and the output voltage Vo1 of the sub power source circuit 20 is the predetermined voltage difference ΔV or more (NO in S7), the process returns to S6, and the voltage control circuit 30 outputs a sub voltage determining signal and decreases the output voltage Vo1, and repeats the processes in S6 and S7 until a difference between the output voltage Voms of the main power source circuit 10 and the output voltage Vo1 of the sub power source circuit 20 becomes less than the predetermined voltage difference ΔV.

Then the voltage control circuit 30 further outputs a main voltage determining signal and decreases the output voltage Vom. At this time, similar to the process in S6, the voltage control circuit 30 gradually changes the output voltage Vrm from the DAC 11 shown in FIG. 2 or a value output from the variable resistor R12 shown in FIG. 3. The changing speed of the output voltage Vom is controlled to be approximately equal to the changing speed of the output voltage Vo1. With this, the output voltages Vom and Vo1 are decreased (S8).

During the decreases of the output voltages Vom and Vo1, the processes from S11 through S14 are performed.

Returning to S5, when the output from the WCMP 60 is a high level signal; that is, when a difference between the output voltage Vo1S of the sub power source circuit 20 before being changed and the output voltage VomS of the main power source circuit 10 before being changed is the predetermined voltage difference ΔV or less (NO in S5), similar to the processes in S2 and S6, the voltage control circuit 30 decreases the output voltages Vom and Vo1 with the same changing speed (S9). During the decreases of the output voltages Vom and Vo1, the processes from S11 through S14 described above are performed.

As described above, in the middle of the decreases of the output voltages Vom and Vo1, when the output from the WCMP 60 (the voltage difference detecting circuit) becomes a low level signal, the voltage control circuit 30 detects that the difference between the output voltages Vom and Vo1 becomes the predetermined voltage difference ΔV or more. Then the voltage control circuit 30 temporarily stops the decreases of the output voltages Vom and Vo1. After this, when the output from the WCMP 60 becomes a high level signal, the voltage control circuit 30 detects that the difference between the output voltages Vom and Vo1 becomes less than the predetermined voltage difference ΔV. Then the voltage control circuit 30 restarts to decrease the output voltages Vom and Vo1. With this, the maximum value of the difference between the output voltages Vom and Vo1 can be maintained within the predetermined voltage difference ΔV.

Similar to the first embodiment of the present invention, in the second embodiment of the present invention, when the predetermined voltage difference ΔV is determined to be a value slightly less than an actual allowable voltage difference of the output voltages Vom and Vo1, the predetermined voltage difference ΔV can work well.

In the first and second embodiments of the present invention, the number of the sub power source circuit 20 is one. However, the number of the sub power source circuits is not limited to one. In a case where plural sub power source circuits are included in a power source device, when plural CMPs or WCMPs are provided for detecting voltage differences between the plural sub power source circuits and a main power source circuit, the embodiments of the present invention can be applied to the power source device having the main power source circuit and the plural sub power source circuits.

In addition, the voltage difference to be detected by the WCMP 60 can determined in each process of the flowchart.

In addition, in the embodiments of the present invention, digital control is used for changing a value of the reference voltage or a value of the variable resistor; however, analog control can be applied to the embodiments of the present invention.

Further, the present invention is not limited to the embodiments, but various variations and modifications may be made without departing from the scope of the present invention.

The present invention is based on Japanese Priority Patent Application No. 2008-104163 filed on Apr. 11, 2008, with the Japanese Patent Office, the entire contents of which are hereby incorporated herein by reference.

The invention claimed is:

1. A power source device having a main power source circuit whose output voltage is changeable and one or more sub power source circuits whose output voltage is changed in the same changing direction as a changing direction of the output voltage of the main power source circuit when the output voltage of the main power source circuit is changed, comprising:
   a voltage difference detecting circuit which detects whether a voltage difference between the output voltage of the main power source circuit and the output voltage of the sub power source circuit is within a predetermined voltage difference; and
   a voltage control circuit which controls the output voltage of the main power source circuit and the output voltage of the sub power source circuit based on a voltage changing signal and an output from the voltage difference detecting circuit; wherein
   the voltage control circuit changes the output voltage of the main power source circuit and the output voltage of the sub power source circuit based on the voltage changing signal; and
   when the voltage difference detecting circuit detects that the voltage difference between the output voltage of the main power source circuit and the output voltage of the sub power source circuit is more than the predetermined voltage difference,
   the voltage control circuit controls output voltage changing speeds of the output voltage of the main power source circuit and the output voltage of the sub power source circuit so that the voltage difference between the output voltage of the main power source circuit and the output voltage of the sub power source circuit is within the predetermined voltage difference.

2. The power source device as claimed in claim 1, wherein:
   when the voltage control circuit detects that the output voltage of the main power source circuit before being changed is different from the output voltage of the sub power source circuit before being changed and detects that a part where an output voltage of the main power source circuit between before being changed and after being changed does not overlap an output voltage of the sub power source circuit between before being changed and after being changed based on the output from the voltage difference detecting circuit,
   the voltage control circuit changes either the output voltage of the main power source circuit or the output voltage of the sub power source circuit until the voltage difference detecting circuit detects that the voltage difference between the output voltage of the main power source circuit and the output voltage of the sub power source circuit is within the predetermined voltage difference; and
   when the voltage difference detecting circuit detects that the voltage difference between the output voltage of the main power source circuit and the output voltage of the sub power source circuit is more than the predetermined voltage difference, during which one or both of the output voltages of the main power source circuit and the sub power source circuit reach target output voltages after the voltage difference between the output voltages of the main power source circuit and the sub power source circuit becomes within the predetermined voltage difference,
   the voltage control circuit controls the output voltage changing speeds of the output voltages of the main power source circuit and the sub power source circuit so that the voltage difference between the output voltages of the main power source circuit and the sub power source circuit becomes within the predetermined voltage difference.

3. The power source device as claimed in claim 1, wherein:
   each of the main power source circuit and the sub power source circuit includes
   a reference voltage circuit which outputs a reference voltage;
   an output voltage detecting circuit which outputs a voltage proportional to the output voltage; and
   an error amplifying circuit which amplifies a difference between the reference voltage and the voltage output from the output voltage detecting circuit, wherein
   the voltage control circuit changes the output voltages of the main power source circuit and the sub power source circuit by gradually changing the reference voltages for a predetermined period based on the voltage changing signal and the output from the voltage difference detecting circuit.

4. The power source device as claimed in claim 1, wherein:
   each of the main power source circuit and the sub power source circuit includes
   a reference voltage circuit which outputs a reference voltage;
   an output voltage detecting circuit which outputs a voltage proportional to the output voltage; and
   an error amplifying circuit which amplifies a difference between the reference voltage and the voltage output from the output voltage detecting circuit; wherein
   the voltage control circuit changes the output voltages of the main power source circuit and the sub power source circuit by gradually changing the voltages output from the output voltage detecting circuits for a predetermined period based on the voltage changing signal and the output from the voltage difference detecting circuit.

5. The power source device as claimed in claim 4, wherein:
when the voltage difference detecting circuit detects that the voltage difference between the output voltages of the main power source circuit and the sub power source circuit is more than the predetermined voltage difference during the increases of the output voltages of the main power source circuit and the sub power source circuit,
the voltage control circuit controls so that the voltage difference between the output voltages of the main power source circuit and the sub power source circuit is within the predetermined voltage difference by stopping changes of the reference voltage or the output voltage from the output voltage detecting circuit whose output voltage is higher than the other at the detection time or by decreasing the changing speed of the reference voltage or the output voltage from the output voltage detecting circuit whose output voltage is higher than the other at the detection time, or by increasing the changing speed of the reference voltage or the output voltage from the output voltage detecting circuit whose output voltage is lower than the other at the detection time.

6. The power source device as claimed in claim 4, wherein:
when the voltage difference detecting circuit detects that the voltage difference between the output voltages of the main power source circuit and the sub power source circuit is more than the predetermined voltage difference during the decreases of the output voltages of the main power source circuit and the sub power source circuit,
the voltage control circuit controls so that the voltage difference between the output voltages of the main power source circuit and the sub power source circuit is within the predetermined voltage difference by stopping changes of the reference voltage or the output voltage from the output voltage detecting circuit whose output voltage is lower than the other at the detection time or by decreasing the changing speed of the reference voltage or the output voltage from the output voltage detecting circuit whose output voltage is lower than the other at the detection time, or by increasing the changing speed of the reference voltage or the output voltage from the output voltage detecting circuit whose output voltage is higher than the other at the detection time.

7. The power source device as claimed in claim 4, wherein:
when the voltage difference detecting circuit detects that the voltage difference between the output voltages of the main power source circuit and the sub power source circuit is more than the predetermined voltage difference during the changes of the output voltages of the main power source circuit and the sub power source circuit,
the voltage control circuit temporarily stops changing the reference voltages or the voltages output from the output voltage detecting circuits of the main power source circuit and the sub power source circuit, and restarts the changes of the reference voltages or the voltages output from the output voltage detecting circuits when the voltage difference between the output voltages of the main power source circuit and the sub power source circuit retunes to within the predetermined voltage difference.

8. An output voltage changing method for changing output voltages of a power source device having a main power source circuit whose output voltage is changeable and one or more sub power source circuits whose output voltage is changed in the same changing direction as a changing direction of the output voltage of the main power source circuit when the output voltage of the main power source circuit is changed, wherein
the power source device includes
a voltage difference determining unit which determines whether a voltage difference between the output voltages of the main power source circuit and the sub power source circuit is within a predetermined voltage difference; and
a voltage control unit which controls the output voltages of the main power source circuit and the sub power source circuit based on a voltage changing signal and an output from the voltage difference determining unit; wherein
the output voltage changing method includes the steps of
changing the output voltages of the main power source circuit and the sub power source circuit based on the voltage changing signal by the voltage control circuit; and
when the voltage difference between the output voltages of the main power source circuit and the sub power source circuit is more than the predetermined voltage difference is detected by the voltage difference determining unit,
controlling output voltage changing speeds of the output voltages of the main power source circuit and the sub power source circuit so that the voltage difference between the output voltages of the main power source circuit and the sub power source circuit is within the predetermined voltage difference.

9. The output voltage changing method as claimed in claim 8, further comprising the steps of:
when the output voltage of the main power source circuit before being changed is different from the output voltage of the sub power source circuit before being changed and a part where an output voltage of the main power source circuit between before being changed and after being changed does not overlap an output voltage of the sub power source circuit between before being changed and after being changed exists,
changing either the output voltage of the main power source circuit or the output voltage of the sub power source circuit until the voltage difference determining unit determines that the voltage difference between the output voltages of the main power source circuit and the sub power source circuit is within the predetermined voltage difference; and
when the voltage difference between the output voltages of the main power source circuit and the sub power source circuit is determined to be more than the predetermined voltage difference by the voltage difference determining unit, during which one or both of the output voltages of the main power source circuit and the sub power source circuit reach target output voltages after the voltage difference between the output voltages of the main power source circuit and the sub power source circuit becomes within the predetermined voltage difference,
controlling the output voltage changing speeds of the output voltages of the main power source circuit and the sub power source circuit so that the voltage difference between the output voltages of the main power source circuit and the sub power source circuit becomes within the predetermined voltage difference.

10. The output voltage changing method as claimed in claim 8, wherein:
each of the main power source circuit and the sub power source circuit includes
a reference voltage circuit which outputs a reference voltage;

an output voltage detecting circuit which outputs a voltage proportional to the output voltage; and an error amplifying circuit which amplifies a difference between the reference voltage and the voltage output from the output voltage detecting circuit, wherein the output voltage changing method further includes the step of changing the output voltages of the main power source circuit and the sub power source circuit by gradually changing the reference voltages for a predetermined period based on the voltage changing signal and the output from the voltage difference determining unit.

11. The output voltage changing method as claimed in claim 8, wherein:

each of the main power source circuit and the sub power source circuit includes a reference voltage circuit which outputs a reference voltage;

an output voltage detecting circuit which outputs a voltage proportional to the output voltage; and an error amplifying circuit which amplifies a difference between the reference voltage and the voltage output from the output voltage detecting circuit; wherein the output voltage changing method further includes the step of changing the output voltages of the main power source circuit and the sub power source circuit by gradually changing the voltages output from the output voltage detecting circuits for a predetermined period based on the voltage changing signal and the output from the voltage difference determining unit.

12. The output voltage changing method as claimed in claim 11, further comprising the step of:

when the voltage difference between the output voltages of the main power source circuit and the sub power source circuit is more than the predetermined voltage difference during the increases of the output voltages of the main power source circuit and the sub power source circuit, controlling so that the voltage difference between the output voltages of the main power source circuit and the sub power source circuit is within the predetermined voltage difference by stopping changes of the reference voltage or the output voltage from the output voltage detecting circuit whose output voltage is higher than the other at the detection time or by decreasing the changing speed of the reference voltage or the output voltage from the output voltage detecting circuit whose output voltage is higher than the other at the detection time, or by increasing the changing speed of the reference voltage or the output voltage from the output voltage detecting circuit whose output voltage is lower than the other at the detection time.

13. The output voltage changing method as claimed in claim 11, further comprising the step of:

when the voltage difference between the output voltages of the main power source circuit and the sub power source circuit is more than the predetermined voltage difference during the decreases of the output voltages of the main power source circuit and the sub power source circuit, controlling so that the voltage difference between the output voltages of the main power source circuit and the sub power source circuit is within the predetermined voltage difference by stopping changes of the reference voltage or the output voltage from the output voltage detecting circuit whose output voltage is lower than the other at the detection time or by decreasing the changing speed of the reference voltage or the output voltage from the output voltage detecting circuit whose output voltage is lower than the other at the detection time, or by increasing the changing speed of the reference voltage or the output voltage from the output voltage detecting circuit whose output voltage is higher than the other at the detection time.

14. The output voltage changing method as claimed in claim 11, further comprising the step of:

when the voltage difference between the output voltages of the main power source circuit and the sub power source circuit is more than the predetermined voltage difference during the changes of the output voltages of the main power source circuit and the sub power source circuit, temporarily stopping the change of the reference voltages or the voltages output from the output voltage detecting circuits of the main power source circuit and the sub power source circuit, and restarting changes of the reference voltages or the voltages output from the output voltage detecting circuits when the voltage difference between the output voltages of the main power source circuit and the sub power source circuit retunes to within the predetermined voltage difference.

\* \* \* \* \*